(12) United States Patent
Yang et al.

(10) Patent No.: US 11,768,385 B2
(45) Date of Patent: Sep. 26, 2023

(54) 3D DISPLAY DEVICE AND DISPLAY METHOD

(71) Applicant: BOE TECHNOLOGY GROUP CO., LTD., Beijing (CN)

(72) Inventors: Junxing Yang, Beijing (CN); Tao Hong, Beijing (CN); Sen Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 166 days.

(21) Appl. No.: 17/355,298

(22) Filed: Jun. 23, 2021

(65) Prior Publication Data
US 2022/0163815 A1 May 26, 2022

(30) Foreign Application Priority Data
Nov. 24, 2020 (CN) .......................... 202011331470.8

(51) Int. Cl.
*G02B 30/27* (2020.01)
*G02F 1/1335* (2006.01)
*H04N 13/305* (2018.01)
*G09G 3/00* (2006.01)
*H04N 13/383* (2018.01)

(52) U.S. Cl.
CPC ....... *G02B 30/27* (2020.01); *G02F 1/133538* (2021.01); *H04N 13/305* (2018.05); *G09G 3/003* (2013.01); *H04N 13/383* (2018.05)

(58) Field of Classification Search
CPC .... G02B 30/27; H04N 13/305; H04N 13/383; G02F 1/133538
See application file for complete search history.

(56) References Cited

U.S. PATENT DOCUMENTS

| 2016/0234487 A1* | 8/2016 | Kroon | H04N 13/356 |
| 2018/0003995 A1* | 1/2018 | Bui | H04N 13/32 |
| 2018/0376134 A1* | 12/2018 | Koerber | H04N 13/383 |
| 2019/0364258 A1* | 11/2019 | Sumi | H04N 13/383 |
| 2021/0109369 A1* | 4/2021 | Verstegen | H04N 13/305 |

* cited by examiner

*Primary Examiner* — Rowina J Cattungal
(74) *Attorney, Agent, or Firm* — Calfee, Halter & Griswold LLP

(57) ABSTRACT

The present disclosure relates to a 3D display device, includes: a display panel; a lens layer arranged on a light exit side of the display panel, and including a plurality of convergent lenses arranged in an array; a human eye tracker provided on a side of the lens layer away from the display panel, the human eye tracker being used to determine spatial positions of one or more viewers' eyes relative to the display panel when facing the display panel; and a controller electrically connected to the display panel and the human eye tracker, the controller being used to receive the spatial positions and control subpixels of the display panel corresponding to the spatial positions to display image slices corresponding to the spatial positions.

10 Claims, 15 Drawing Sheets

3D DISPLAY DEVICE AND DISPLAY METHOD

This application is based upon and claims priority to Chinese Application No. 202011331470.8, filed Nov. 24, 2020, the entire contents of which are incorporated herein by reference.

TECHNICAL FIELD

The present disclosure relates to 3D display technologies, and in particular, to a 3D display device and a display method for the 3D display device.

BACKGROUND

With the continuous developments of display technologies, three dimensional (3D) display technology has attracted more and more attention. Three-dimensional display technology can make the displayed images become three-dimensional and realistic. The principle is to use the left and right eyes of a person to receive left and right eye images with a certain parallax. When the two parallax images are received by the left and right eyes, respectively, the image information can be superimposed and fused by the person's brain to construct a 3D visual display effect.

Currently, there exists multi-view 3D display devices based on the principle of binocular parallax. FIG. 1 shows a schematic diagram of a four-view 3D display principle in related art. A first view, a second view, a third view, and a fourth view are formed in a viewing zone from right to left. The four views are periodically arranged in the above order to form a plurality of viewing zones. Each view in the same viewing zone displays different image slices. For example, when a viewer's right eye is at the 4th view and the left eye is at the 1st view in a different viewing zone, there will be a visual jump, that is, a reversal zone or a dead zone; and there are few views and poor continuity (there are only 4 views spatially continuously distributed)), resulting in a poor viewing experience.

The above-mentioned information disclosed in the background section is only used to strengthen the understanding of the background of the present disclosure, and therefore it may include information that does not constitute the prior art known to those of ordinary skill in the art.

SUMMARY

In order to addressing the above issue of visual jump, an objective of the present disclosure is to provide a 3D display device without the visual jump and a display method for the 3D display device.

The additional aspects and advantages of the present disclosure will become apparent from the following descriptions, or may be learned through practice of the present disclosure.

According to an aspect of the present disclosure, there is provided a 3D display device, including:

a display panel;

a lens layer arranged on a light exit side of the display panel, and including a plurality of convergent lenses arranged in an array;

a human eye tracker provided on a side of the lens layer away from the display panel, wherein the human eye tracker is used to determine spatial positions of one or more viewers' eyes relative to the display panel when facing the display panel; and a controller electrically connected to the display panel and the human eye tracker, wherein the controller is used to receive the spatial positions and control subpixels of the display panel corresponding to the spatial positions to display image slices corresponding to the spatial positions.

According to an exemplary embodiment of the present disclosure, the 3D display device further includes:

a polarization modulation member arranged between the display panel and the lens layer, and electrically connected to the controller;

wherein the human eye tracker is used to determine at least two spatial positions of at least two viewers' eyes relative to the display panel when facing the display panel, the at least two spatial positions corresponding to at least two moments within a preset time period one to one;

wherein the controller is used to control subpixels corresponding to the at least two spatial positions to start to display image slices corresponding to the at least two spatial positions at corresponding moments;

wherein the polarization modulation member is used to, according to the at least two spatial positions, adjust polarization modulation states of the polarization modulation member to make light from the subpixels corresponding to the at least two spatial positions pass through the polarization modulation member at a corresponding moment, so that the light is incident on a correspond one of the viewers.

According to an exemplary embodiment of the present disclosure, the polarization modulation member includes:

a first polarization modulator arranged on the light exit side of the display panel, wherein the first polarization modulator includes a plurality of first modulation units arranged in an array, and one subpixel of the display panel corresponds to one of the first modulation units of the first polarization modulator, and the first modulation units are used to modulate polarization states of light emitted by corresponding subpixels; and a second polarization modulator arranged on a side of the first polarization modulator away from the display panel, wherein the second polarization modulator includes a plurality of second modulation units arranged in an array, one of the convergent lenses in the lens layer corresponds to one of the second modulation units of the second polarization modulator, and the second modulation units are used to modulate polarization states of light passing through the first polarization modulator and make the light pass through or block the light.

According to an exemplary embodiment of the present disclosure, the first polarization modulator includes a first liquid crystal phase modulator.

According to an exemplary embodiment of the present disclosure, the second polarization modulator includes:

a second liquid crystal phase modulator used to modulate the polarization states of the light passing through the first polarization modulator; and a linear polarizer arranged on a side of the second liquid crystal phase modulator close to the lens layer, and used to make the light modulated by the second liquid crystal phase modulator pass through or block the light modulated by the second liquid crystal phase modulator.

According to an exemplary embodiment of the present disclosure, each of the convergent lenses is a liquid crystal convergent lens, which serves as the second liquid crystal phase modulator of the second polarization modulator, and the linear polarizer is arranged on a side of the lens layer away from the display panel.

According to an exemplary embodiment of the present disclosure, the 3D display device further includes a light-transmitting substrate arranged between the first polarization modulator and the second polarization modulator.

According to an exemplary embodiment of the present disclosure, the display panel and the lens layer meets the following relational expressions:

$$\frac{L}{f} = \frac{w}{P_x}$$
$$\frac{L}{L+f} = \frac{D_1}{D_2}$$
$$D_2 = N * P_x$$
$$t = n * f$$

where L is a viewing distance from the viewers' eyes to the light-transmitting substrate; f is a focal length of each convergent lens in air; D1 is a width of each convergent lens, D2 is a width of a pixel island, and D1<D2; N is a number of subpixels in a width direction of one pixel island, with a value of 4; Px is a width of a single subpixel; w is an interpupillary distance of a person, with a value of 65 mm; t is a thickness of the light-transmitting substrate; and n is a refractive index of the light-transmitting substrate.

According to an exemplary embodiment of the present disclosure, the spatial positions are viewing zone order numbers and view numbers.

According to another aspect, there is provided a display method of a 3D display device, used for the 3D display device described above, wherein the method includes:

determining spatial positions of one or more viewers' eyes relative to a display panel when facing the display panel; and controlling subpixels of the display panel corresponding to the spatial positions to display image slices corresponding to the spatial positions.

According to an exemplary embodiment of the present disclosure, determining spatial positions of one or more viewers' eyes relative to a display panel when facing the display panel, includes:

determining at least two spatial positions of at least two viewers' eyes relative to the display panel when facing the display panel, the at least two spatial positions corresponding to at least two moments within a preset time period one to one.

According to an exemplary embodiment of the present disclosure, the method further includes:

controlling subpixels corresponding to the at least two spatial positions to start to display image slices corresponding to the at least two spatial positions at corresponding moments; and according to the at least two spatial positions, adjusting polarization modulation states of a polarization modulation member to make light from the subpixels corresponding to the at least two spatial positions pass through the polarization modulation member at a corresponding moment, so that the light is incident on a correspond one of the viewers.

According to an exemplary embodiment of the present disclosure, at least two spatial positions of at least two viewers' eyes relative to the display panel when facing the display panel, includes:

determining, at a first moment, first spatial positions of eyes of a first viewer relative to the display panel when the eyes of the first viewer face the display panel; and determining, at a second moment, second spatial positions of eyes of a second viewer relative to the display panel when the eyes of the second viewer face the display panel;

wherein after the first spatial positions are determined, the display method further includes:

controlling subpixels corresponding to the first spatial positions to start to display image slices corresponding to the first spatial positions at a first moment, and according to the first spatial positions, adjusting polarization modulation states of the polarization modulation member to make light from the subpixels corresponding to the first spatial positions pass through the polarization modulation member at the first moment, so that the light is incident only on the first viewer;

wherein after the second spatial positions are determined, the display method further includes:

controlling subpixels corresponding to the second spatial positions to start to display image slices corresponding to the second spatial positions at a second moment, and according to the second spatial positions, adjusting polarization modulation states of the polarization modulation member to make light from the subpixels corresponding to the second spatial positions pass through the polarization modulation member at the second moment, so that the light is incident only on the second viewer;

wherein a time interval between the first moment and the second moment is smaller than a refresh time of human vision.

According to an exemplary embodiment of the present disclosure, an arrangement of the polarization modulation states of second modulation units is based on an interval between a second modulation unit through which light from a subpixel is incident to the first viewer at the first moment and a second modulation unit through which light from the subpixel is incident to the second viewer at the second moment.

According to an exemplary embodiment of the present disclosure, if the first spatial positions and the second spatial positions are located in adjacent viewing zones, the polarization modulation states of the second modulation units of the second polarization modulator are arranged alternately;

if the first spatial positions and the second spatial positions are located in viewing zone arranged between which another viewing zone is provided, the polarization modulation states of the second modulation units of the second polarization modulator are arranged as: pairs of polarization modulation states are arranged alternately;

if the first spatial positions and the second spatial positions both span two viewing zones and the difference between the first spatial positions and the second spatial positions is one viewing zone, the polarization modulation states of the second modulation units of the second polarization modulator are arranged alternately; and if the first spatial positions and the second spatial positions both span two viewing zones and the difference between the first spatial positions and the second spatial positions is two viewing zones, the polarization modulation states of the second modulation units of the second polarization modulator are arranged as: pairs of the polarization modulation states are arranged alternately.

According to an exemplary embodiment of the present disclosure, states of light emitted from a same subpixel after modulation by the first liquid crystal phase modulator at the first moment and the second moment are opposite.

It can be seen from the above technical solutions that the present disclosure has at least one of the following advantages and positive effects:

In the 3D display device according to embodiments of the present disclosure, the lens layer is provided on the light exit side of the display panel, and the lens layer includes a plurality of convergent lenses arranged in an array. The human eye tracker is provided on the side of the lens layer away from the display panel. The tracker is used to determine the spatial positions of one or more viewers' eyes relative to the display panel when facing the display panel. The controller is used to receive the spatial positions and control subpixels corresponding to the spatial positions to display image slices corresponding to the spatial positions. On the one hand, the human eye tracking system can determine the spatial positions of the eyes, the subpixels of the display panel corresponding to the spatial positions can display the image slices corresponding to the spatial positions, so that the viewer's eyes can always see the corresponding image slices, and there will be no visual jump which may occur in related arts. On the other hand, compared with the related arts, embodiments of the present disclosure are not limited to the periodic arrangement of multiple views, but adopt a continuous arrangement of multiple views, which not only enriches the contents and number of views, but also improves the viewing continuity of the views.

BRIEF DESCRIPTION OF THE DRAWINGS

The above and other features and advantages of the present disclosure will become more apparent from the following descriptions of exemplary embodiments with reference to the accompanying drawings.

LISTING OF MAIN REFERENCE SIGNS

Figure 1:
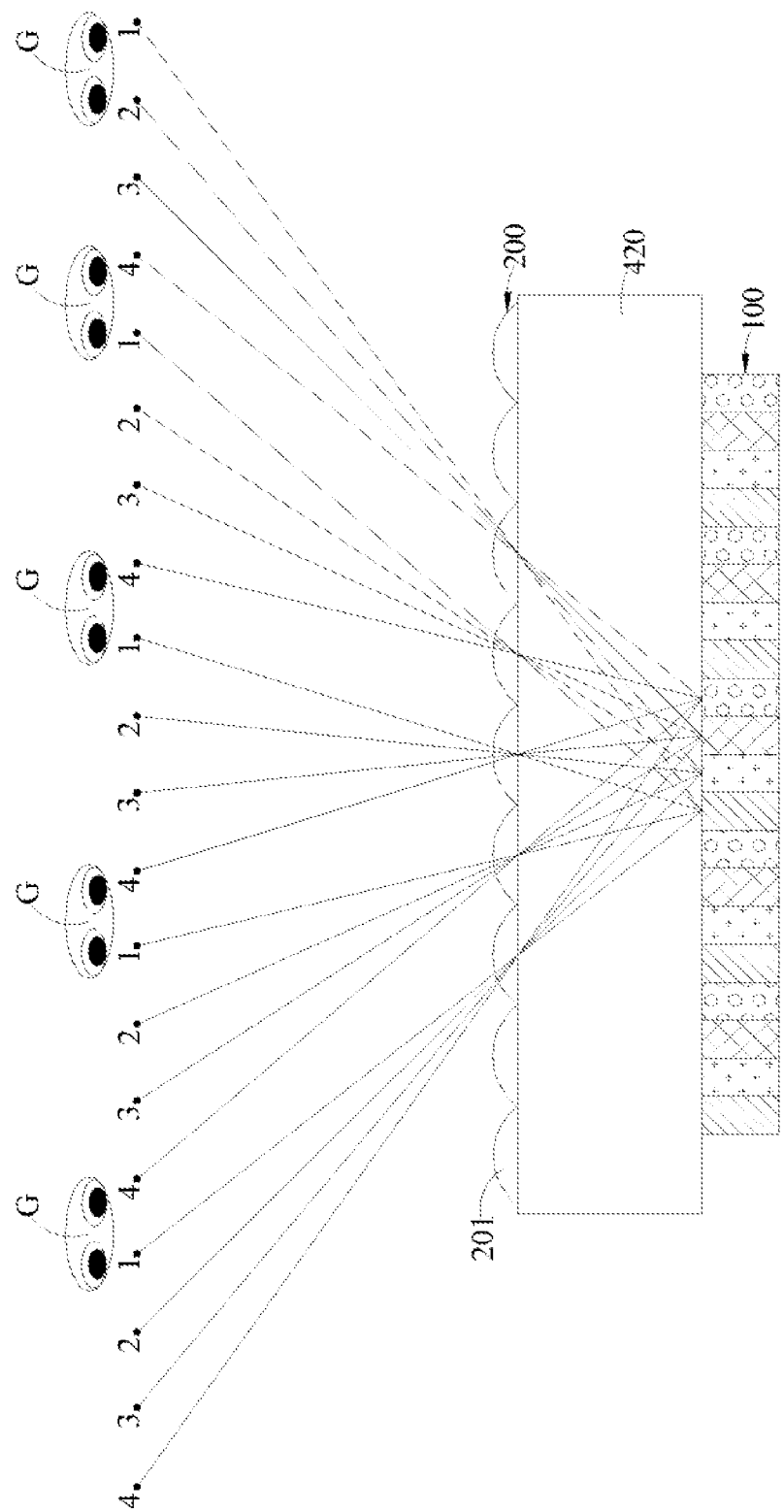
FIG. 1 is a schematic diagram of a four-view 3D display principle in related art.

100: display panel; 110: first pixel group; 120: second pixel group; 130: third pixel group; 140: fourth pixel group; 150: fifth pixel group;

a. first subpixel; b. second subpixel; c. third subpixel; d. fourth subpixel;

200: lens layer; 201: first convergent lens; 202: second convergent lens; 203: third convergent lens; 204: fourth convergent lens; 205: fifth convergent lens; 206: sixth convergent lens; 207: seven convergent lens; 208: eighth convergent lens; 209: ninth convergent lens;

300: human eye tracker;

400: polarization modulation member; 410: first polarization modulator; 411: first glass substrate; 412: second glass substrate; 413: first electrode plate; 414: second electrode plate; 415: first alignment layer; 416: second alignment layer; 417: liquid crystal layer; 420: light-transmitting substrate; 430: second polarization modulator; 431: third glass substrate; 432: fourth glass substrate; 433: third electrode plate; 434: fourth electrode plate; 435: third alignment layer; 436: fourth alignment layer; 437: liquid crystal layer; 438: linear polarizer; 441: No. 1 second modulation unit; 442: No. 2 second modulation unit; 443: No. 3 second modulation unit; 444: No. 4 second modulation unit; 445: No. 5 second modulation unit; 446: No. 6 second modulation unit; 447: No. 7 second modulation unit; 448: No. 8 second modulation unit; 449: No. 9 second modulation unit;

500: controller;

600: liquid crystal convergent lens;

G1: first viewer; G2: second viewer; G: viewer.

DETAILED DESCRIPTION

Example embodiments will now be described more fully with reference to the accompanying drawings. However, the embodiments can be implemented in a variety of forms and should not be construed as being limited to the examples set forth herein; rather, these embodiments are provided so that the present disclosure will be more complete so as to convey the idea of the exemplary embodiments to those skilled in this art. The same reference signs in the drawings indicate the same or similar structures, and thus their repeated descriptions will be omitted.

Figure 2:
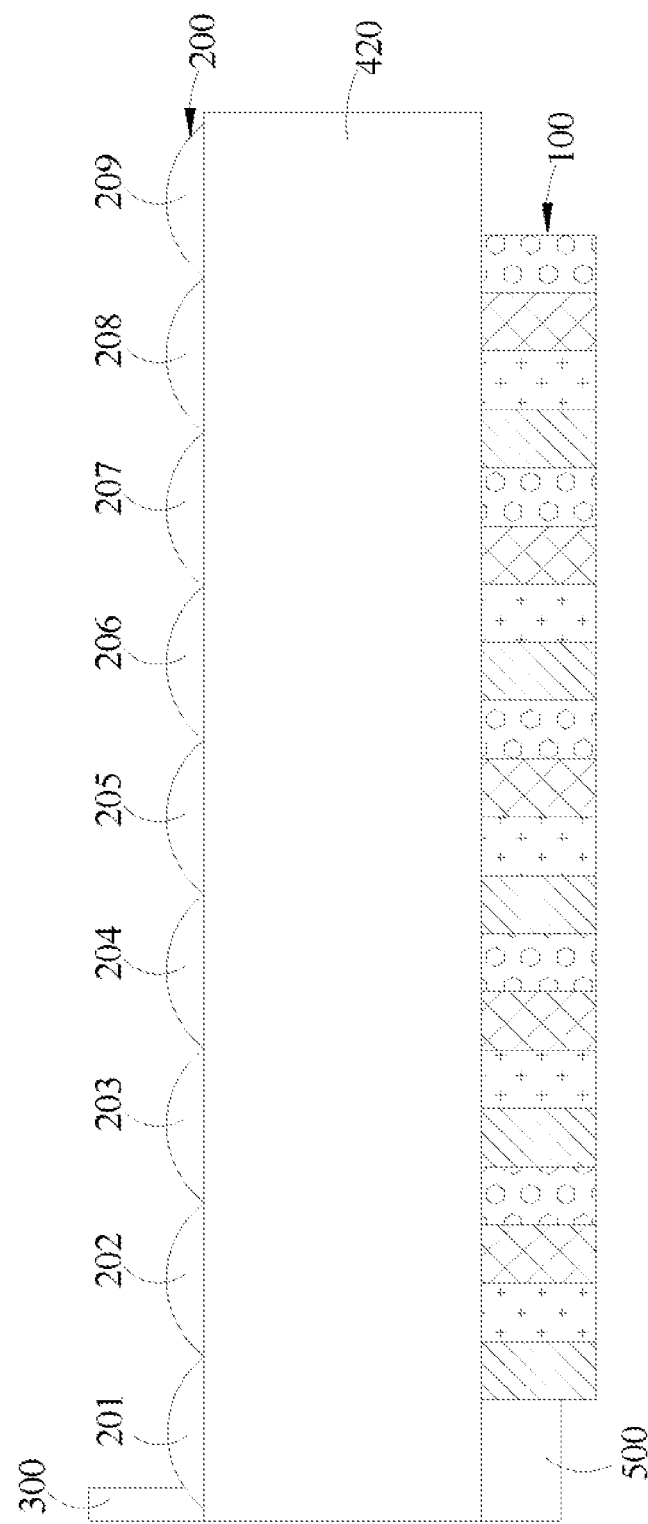
FIG. 2 is a schematic structural diagram of a 3D display device according to an exemplary embodiment of the present disclosure.

An exemplary embodiment first provides a 3D display device. FIG. 2 is a schematic structural diagram of a 3D display device according to an exemplary embodiment of the present disclosure. The display device may include a display panel 100, a lens layer 200, a controller 500, and a human eye tracker 300. The lens layer 200 is arranged on a light exit side of the display panel 100. The lens layer 200 includes a plurality of convergent lenses 201-209 arranged in an array. The human eye tracker 300 is arranged on a side of the lens layer 200 away from the display panel 100. The human eye tracker 300 is used to determine spatial positions of one or more viewers' eyes relative to the display panel 100 when facing the display panel 100. The controller 500 is electrically connected to the display panel 100 and the human eye tracker 300. The controller 500 is used to receive the spatial positions, and control subpixels of the display panel 100 corresponding to the spatial positions to display image slices corresponding to the spatial positions.

In the 3D display device according to embodiments of the present disclosure, the human eye tracking system can determine the spatial positions of the eyes, the subpixels of the display panel 100 corresponding to the spatial positions can display the image slices corresponding to the spatial positions, so that the viewer's eyes can always see the corresponding image slices, and there will be no visual jump which may occur in related arts. As compared with the related arts, embodiments of the present disclosure are not limited to the periodic arrangement of multiple views, but adopt a continuous arrangement of multiple views, which not only enriches the contents and number of views, but also improves the viewing continuity of the views.

In the following example embodiments, although relative terms such as "left" and "right" are used herein to describe the relative relationship between one component in the drawings and another component, these terms are used for convenience in description, for example, and are based on the directions of the examples described in the drawings (left and right are shown in the drawings). It can be understood that if a device shown in the drawings is turned left and right, a component described as "left" will become a "right" component. Other relative terms, such as "high", "low", "top", "bottom", "upper" and "lower" have similar meanings. When a structure is "on" another structure, it may mean that the certain structure is integrally formed on another structure, or that the structure is "directly" installed on another structure, or that the structure is "indirectly" installed on another structure through other structures. In order to avoid confusion, the left-right relationship of the viewer's eyes in the following exemplary embodiments is also described based on the marks in the drawings.

In an exemplary embodiment, the display panel 100 can be any 2D display panel, and can be various LCD (Liquid Crystal Display) panels, for example, an LCOS (Liquid Crystal on Silicon) display panel, which is a new reflective display panel in which LCD and CMOS integrated circuits are integrated. The display panel 100 may also be various OLED (Organic Light-Emitting Diode) display panels 100, for example, Micro-OLED display panels and the like. The pixels of the display panel 100 may be arranged in a pixel island arrangement, or may be arranged in a conventional RGB arrangement.

The lens layer 200 is disposed on the light exit side of the display panel 100. The lens layer 200 includes a plurality of convergent lenses 201-209 arranged in an array. One surface of a convergent lens is set as a plane, and the surface of the convergent lens away from the display panel 100 is convex towards a side away from the display panel 100. In some exemplary embodiments, the convergent lenses are lenticular lenses. A light-transmitting substrate 420 is provided between the lens layer 200 and the display panel 100 to meet the imaging requirements of the lens layer 200.

The human eye tracker 300 can be placed on a surface of the display device, that is, the human eye tracker 300 is provided on a side of the lens layer 200 away from the display panel 100. The human eye tracker 300 may be an image acquisition device, such as a CCD camera. The CCD camera collects face images, and calculates the position coordinates of the viewer's eyes through software, and can also calculate the interpupillary distance of the eyes. The interpupillary distance of the human eyes is generally about 65 mm. The human eye tracker 300 can also be an eyeball tracker, and its working principle is: the eyeball tracker emits invisible infrared light to a user, and then use two built-in cameras to search and capture the "flicker" of the user's eyeballs and the reflection of the retina, and obtains the spatial positions of the human eyes by calculations.

The controller 500 may be provided in the display panel 100, and the controller 500 may be a controller which is originally arranged in the display panel 100, or the controller 500 may be an additionally provided controller. The controller can be various microprocessors, control chips, and so on.

Figure 3:
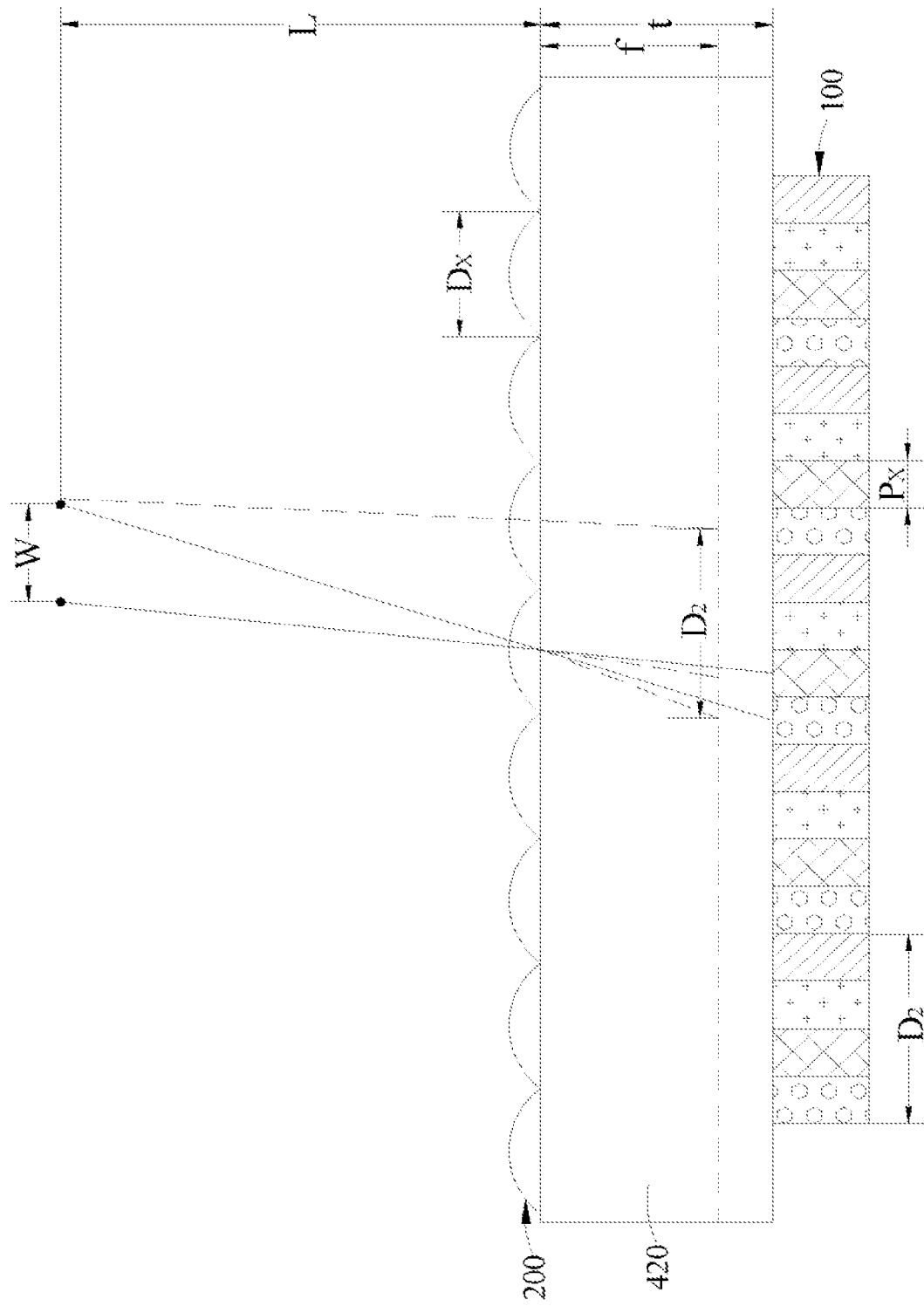
FIG. 3 is a schematic diagram showing the optical path design principle of the 3D display device according to an exemplary embodiment of the present disclosure.

FIG. 3 is a schematic diagram showing the optical path design principle of the 3D display device according to an embodiment of the present disclosure. To achieve full-screen viewing of 3D images, the following equations need be satisfied to ensure that the same views converge at the same point in space to achieve 3D display:

$$\frac{L}{f} = \frac{w}{P_x} \quad (1)$$

$$\frac{L}{L+f} = \frac{D_1}{D_2} \quad (2)$$

$$D_2 = N * P_x \quad (3)$$

$$t = n * f \quad (4)$$

where L is a viewing distance from the viewers' eyes to the light-transmitting substrate 420; f is a focal length of each convergent lens in air; $D_1$ is a width of each convergent lens, $D_2$ is a width of a pixel island (including four subpixels), and $D_1 < D_2$; N is a number of subpixels in a width direction of one pixel island, with a value of 4; Px is a width of a single subpixel; w is an interpupillary distance of a person, which is generally greater than or equal to 60 mm and smaller than or equal to 70 mm, and has a middle value of 65 mm in the above equations; t is a thickness of the light-transmitting substrate 420; and n is a refractive index of the light-transmitting substrate 420. In order to show the light path of the views, the following figures all use equivalent air layer thicknesses, and the thickness is f=t/n.

Figure 4:
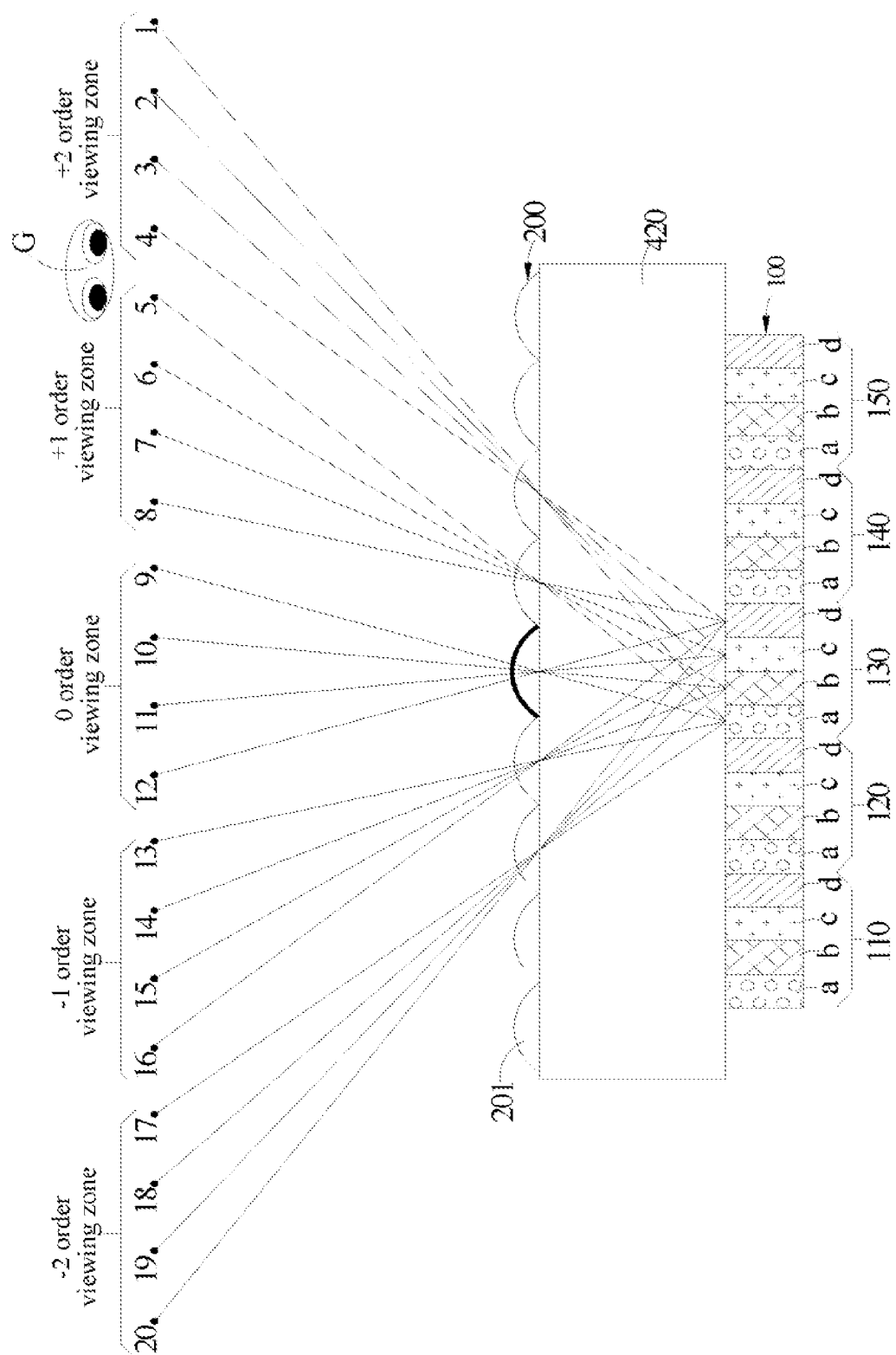
FIG. 4 is a schematic diagram showing the principle of viewing zone division of the 3D display device according to an exemplary embodiment of the present disclosure.

FIG. 4 is a schematic diagram showing the viewing zone division principle of the 3D display device according to an exemplary embodiment of the present disclosure. Through the above-mentioned design as defined by equations (1)-(4), the orderly arrangement of the spatial views can be realized. Taking the traditional four-view 3D display as an example, four subpixels in the width direction form a pixel group, and the subpixels a~d are modulated by the convergent lens (convergent lens are bold marked) directly above them to form a four-view distribution in the space from right to left, which is set as the main viewing zone or the 0 order viewing zone. The subpixels a~d are modulated by the first convergent lenses on the left and right of the convergent lens directly above the subpixels a~d, and the four views are distributed in the space from right to left, which are set as the ±1 order viewing zones. Subpixels a~d are modulated by the second convergent lenses on the left and right of the convergent lens directly above the subpixels a~d, and four views are distributed in the space from right to left, which are set as ±2 order viewing zone. In the same way, a ±3 order viewing zone (not shown in the figure) and so on can be set. According to the actual needs and structural design of the 3D display device, it is sufficient to ensure that the viewing needs of the human eye are met within a certain viewing zone. As a result, different viewing zones are formed in the space, and naked-eye 3D display can be realized when the viewer is in each viewing zone.

In some exemplary embodiments, a spatial position refers to a viewing zone order number and a view number (or, in other words, viewpoint number). The viewing zone order number can include a 0 order viewing zone, a ±1 order viewing zone, and a ±2 order viewing zone, a total of five viewing zone order numbers. There are four views in each viewing zone, and there are a total of twenty views. All views may be numbered in order as 1 to 20. Of course, the views in each viewing zone can also be set as 1, 2, 3, and 4 from right to left. According to some embodiments, the number of views in each viewing zone can also be set to more or less according to actual needs.

Figure 5:
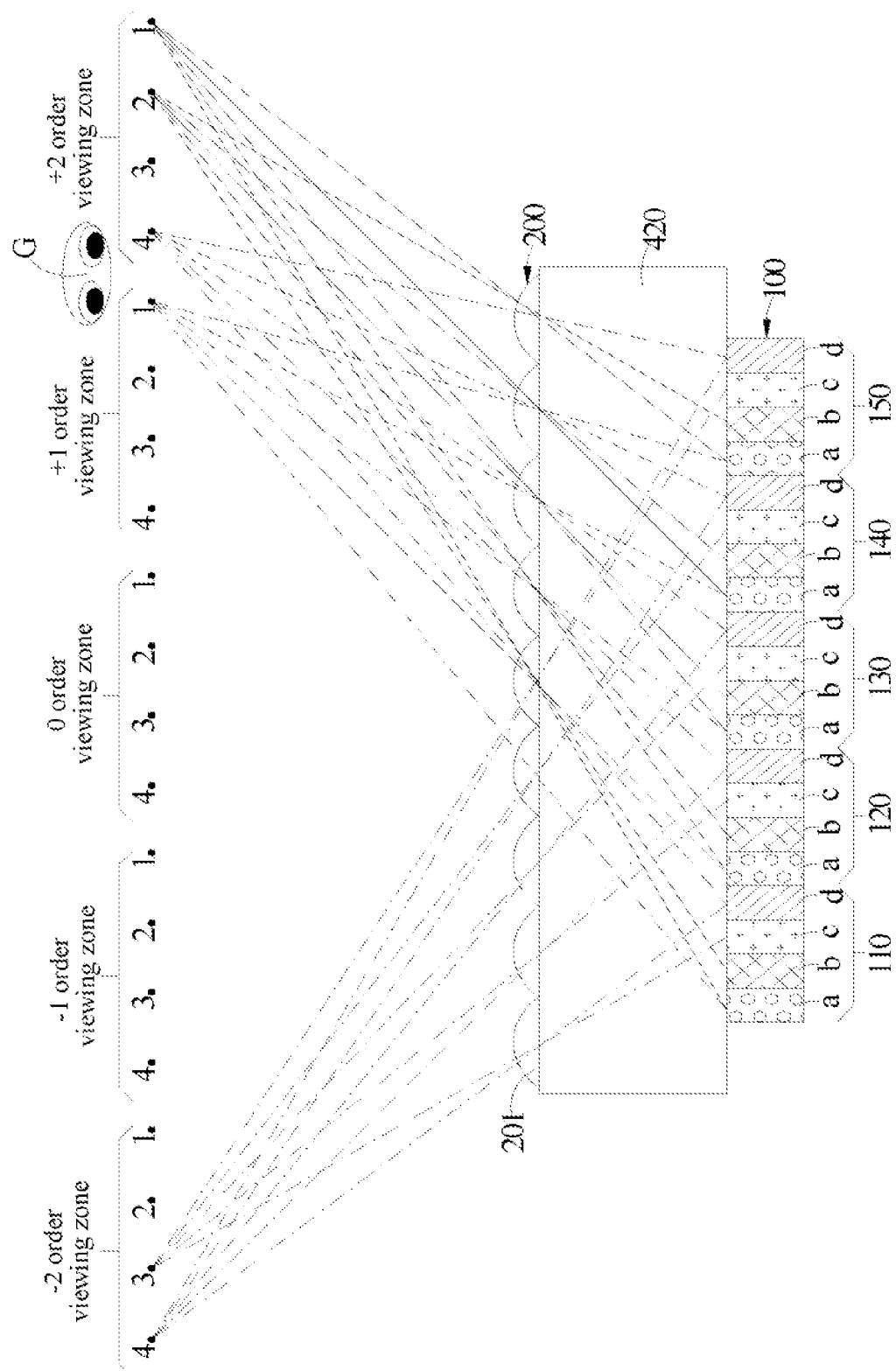
FIG. 5 is a schematic diagram showing the display principle of the 3D display device according to an exemplary embodiment of the present disclosure.

FIG. 5 is a schematic diagram showing the display principle of the 3D display device according to an embodiment of the present disclosure. The light from the subpixels with the same number in individual pixel groups is convergent to corresponding views of the viewing zones through different convergent lenses. In an exemplary embodiment, one view corresponds to one image slice. As shown in FIG. 5, there are twenty views from right to left, and the twenty views correspond to twenty image slices in sequence.

The first view of each viewing zone corresponds to the first subpixel a of each pixel group, the second view of each viewing zone corresponds to the second subpixel b of each pixel group, and third view of each viewing zone corresponds to the third subpixel c of each pixel group, and fourth view of each viewing zone corresponds to the fourth subpixel d of each pixel group.

The subpixels of the display panel 100 corresponding to the spatial positions display image slices corresponding to the spatial positions. For example, the spatial positions of the eyes of the viewer G are the first view (or the fifth view) in the +1 order viewing zone and the fourth view in the +2 order viewing zone, the image slice corresponding to the first view (or the fifth view) in the +1 order viewing zone is the fifth image slice, and the image slice corresponding to the fourth view in the +2 order viewing zone is the fourth mage slice. The driver of the display panel 100 controls the fourth subpixel d of each pixel group to display the fourth image slice, so that the image incident on the right eye of the viewer G is the fourth image slice, and the driver of the display panel 100 controls the first subpixel a of each pixel group to display the fifth image slice, so that the image incident on the left eye of the viewer G is the fifth image slice. There is no visual jump between the fourth image slice and the fifth image slice, and thus the eyes of the viewer G can always see the corresponding image slices without visual jump.

For example, the spatial positions of the eyes of the viewer G are the first view in the +2 order viewing zone and the second view in the +2 order viewing zone. The image slice corresponding to the first view in the +2 order viewing zone is the first image slice, and the image slice corresponding to the second view in the +2 order viewing zone is the second image slice. The driver of the display panel 100 controls the first subpixel a in each pixel group to display the first image slice, so that the image seen by the right eye of the viewer G is the first image slice, and driver of the display panel 100 controls the second subpixel b of each pixel group to display the second image slice, so that the image seen by the left eye of the viewer G is the second image slice. The display principles of the other views are the same as the above, and will not be repeated here.

Figure 6:
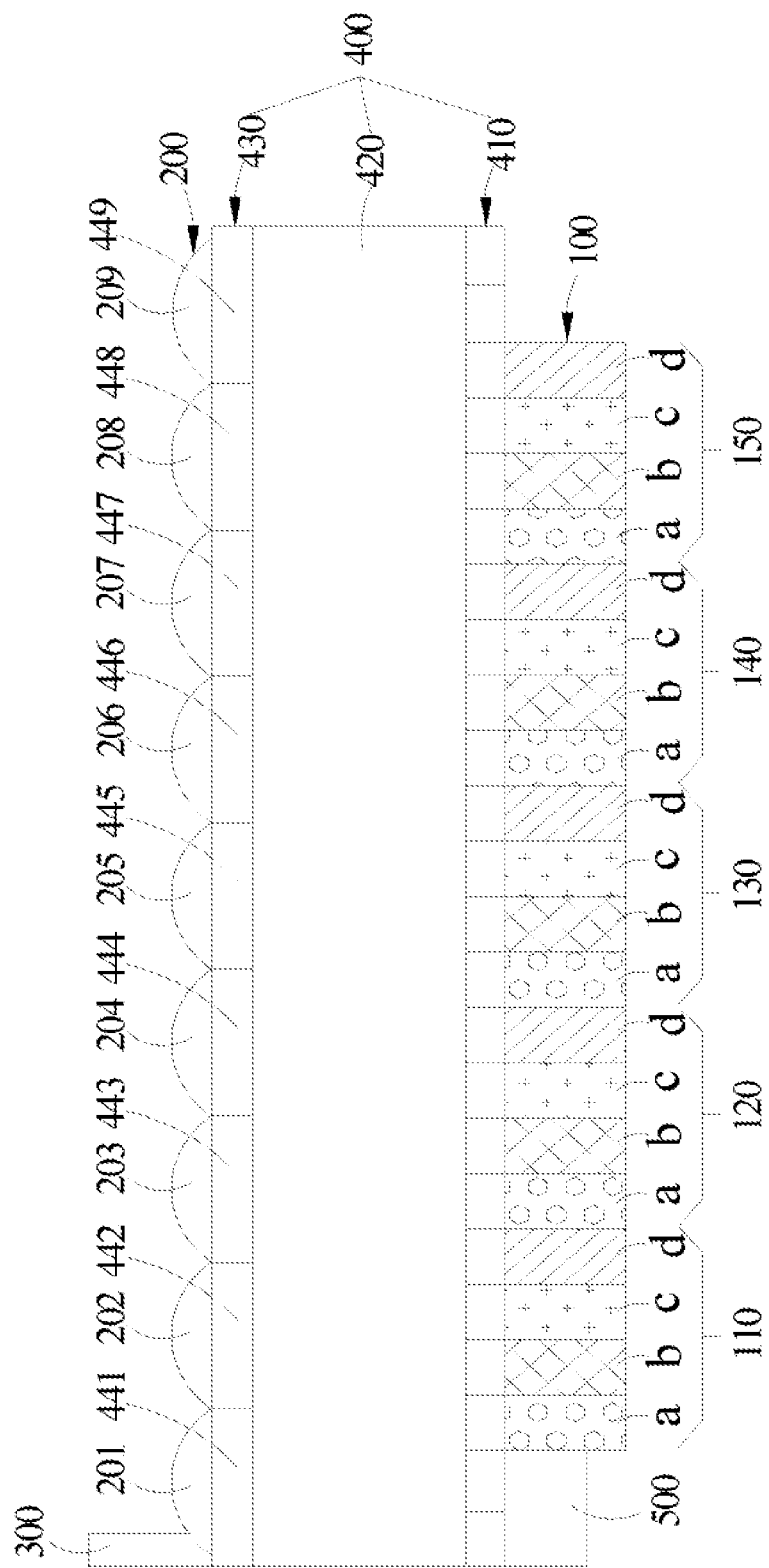
FIG. 6 is a schematic structural diagram of a 3D display device according to an exemplary embodiment of the present disclosure.

FIG. 6 is a schematic structural diagram of a 3D display device according to an exemplary embodiment of the present disclosure. A polarization modulation member 400 is provided between the display panel 100 and the lens layer 200. In this exemplary embodiment, the 3D display device is suitable for simultaneous 3D viewing by two or more viewers. In this case, the human eye tracker 300 is used to determine at least two spatial positions of at least two viewers' eyes relative to the display panel 100 when facing the display panel 100, the at least two spatial positions corresponding to at least two moments within a preset time period one to one. The controller 500 is used to control subpixels corresponding to the at least two spatial positions to start to display image slices corresponding to the at least two spatial positions at corresponding moments. The polarization modulation member 400 is used to, according to the at least two spatial positions, adjust polarization modulation states of the polarization modulation member 400 to make light from the subpixels corresponding to the at least two spatial positions pass through the polarization modulation member at a corresponding moment, so that the light is incident on a correspond one of the viewers. In the subsequent display method of the 3D display device, the situation where two or more viewers perform 3D viewing at the same time will be described in detail, and therefore, it will not be repeated here.

The polarization modulation member 400 may include a first polarization modulator 410, a transparent substrate 420, and a second polarization modulator 430. The first polarization modulator 410 is disposed on the light exit side of the display panel 100, the transparent substrate 420 is disposed on a side of first polarization modulator 410 away from the display panel 100, and the second polarization modulator 430 is disposed on a side of the transparent substrate 420 away from the display panel 100.

Specifically, the first polarization modulator 410 includes a plurality of first modulation units arranged in an array, one subpixel of the display panel 100 corresponds to one first modulation unit of the first polarization modulator 410, and the first modulation units are used to modulate polarization states of light emitted by corresponding subpixels.

Figure 7:
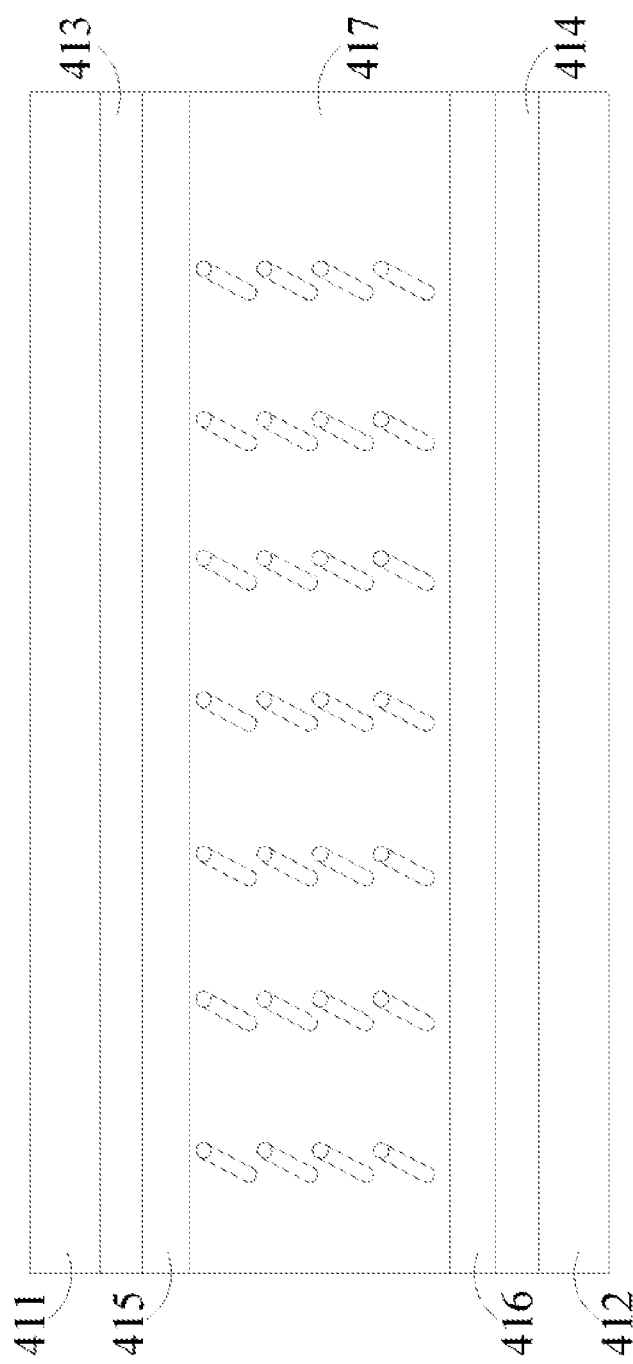
FIG. 7 is a schematic structural diagram of a first modulation unit in FIG. 6.

The first polarization modulator 410 may be a first liquid crystal phase modulator. Referring to FIG. 7, a first modulation unit may include a liquid crystal layer 417, a first glass substrate 411, a second glass substrate 412, a first electrode plate 413, a second electrode plate 414, a first alignment layer 415, and a second alignment layer. 416. The first glass substrate 411 and the second glass substrate 412 are disposed opposite to each other. The first electrode plate 413 is disposed on a side of the first glass substrate 411 close to the second glass substrate 412, and the second electrode plate 414 is disposed on a side of the second glass substrate 412 close to the first glass substrate 411. The first alignment layer 415 is disposed on a side of the first electrode plate 413 away from the first glass substrate 411, and the second alignment layer 416 is disposed on a side of the second electrode plate 414 away from the second glass substrate 412. The liquid crystal layer 417 is provided between the first alignment layer 415 and the second alignment layer 416. By applying voltages to the first electrode plate 413 and the second electrode plate 414, the liquid crystal molecules can be arranged in an orderly manner according to a certain rule, and then the light of different polarization states can be modulated.

The specific working principle is as follows.

When the light is incident on the first liquid crystal phase modulator in a first polarization state (S polarization state), if no external voltage is applied, the outgoing light still maintains the first polarization state (S polarization state) and there is no change. If a certain voltage is applied, under the action of the electric field, the liquid crystal molecules are deflected and arranged according to a certain rule, so that the first polarization state (S polarization state) of the incident light is rotated to a second polarization state (P polarization state), thereby realizing the modulation of the polarization state of the light emitted by the pixel. According to some other embodiments, the first polarization state can be the P polarization state, and the corresponding second polarization state can be the S polarization state. Moreover, the first polarization state and the second polarization state are not limited to the P polarization state or the S polarization state, as long as the first polarization state and the second polarization state may be perpendicular to each other.

The S polarization state and the P polarization state mean that: when light penetrates the surface of an optical element (such as a beam splitter) at a non-perpendicular (or non-vertical) angle, both the reflection and transmission characteristics depend on the polarization phenomenon. In this case, the coordinate system used is defined by the plane containing the input and reflected beams. If the polarization vector of the light is in this plane, the light is called P-polarized light (P polarization state). If the polarization vector is perpendicular to the plane, the light is called S-polarized light (S polarization state). That is, P-polarized light (P polarization state) and S-polarized light (S polarization state) are perpendicular to each other.

The second polarization modulator 430 includes a plurality of second modulation units arranged in an array. One of the convergent lenses in the lens layer 200 corresponds to one of the second modulation units of the second polarization modulator 430. The second modulation units are used to modulate the light which is modulated by the first polarization modulator and make the light pass through or block the light.

Figure 8:
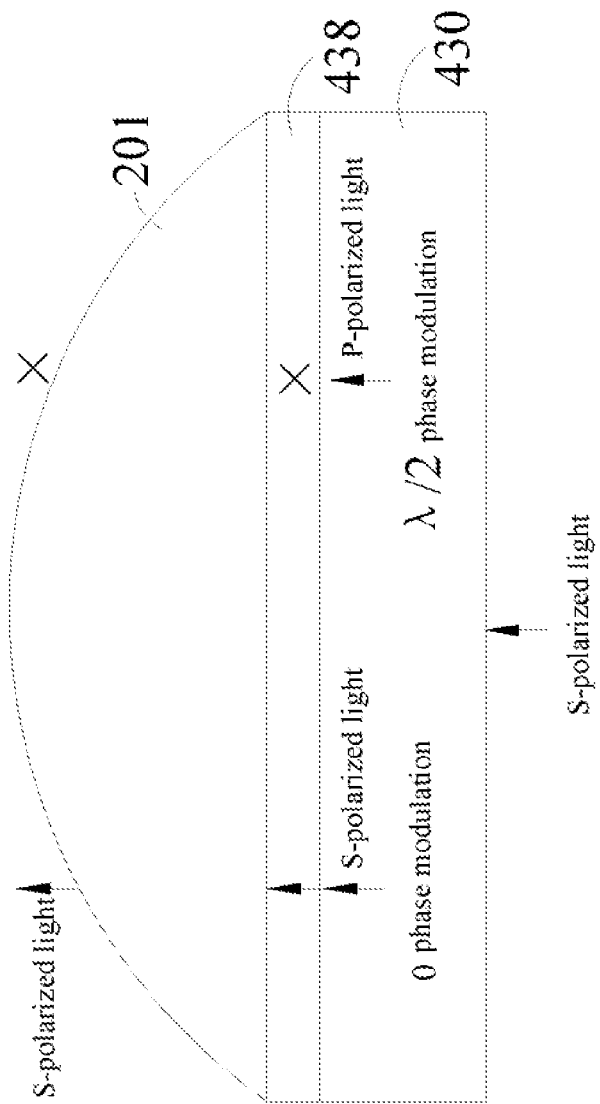
FIG. 8 and FIG. 9 are schematic diagrams showing the modulation principle of the second polarization modulator in FIG. 6.
Figure 9:
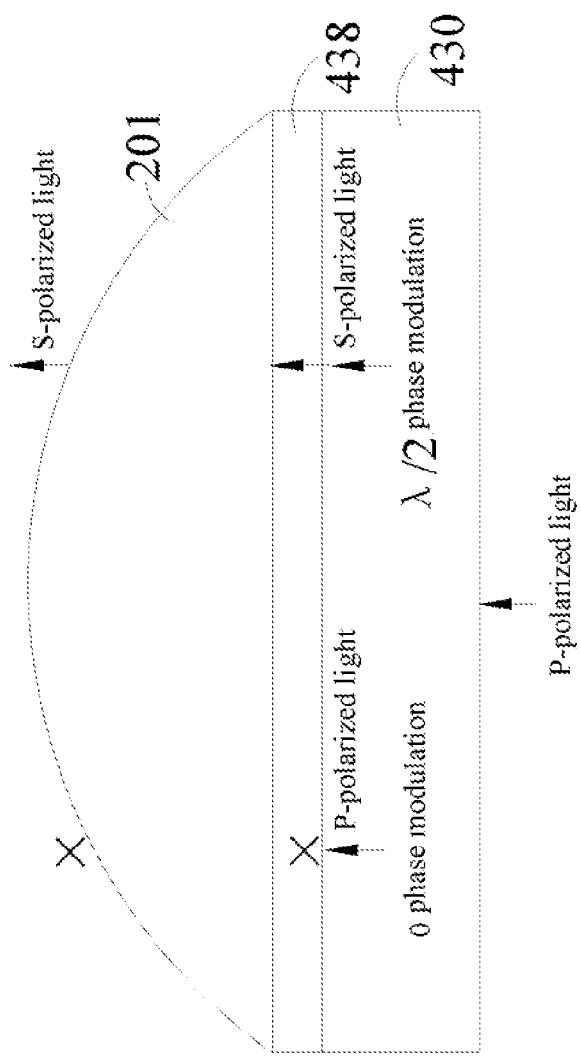

Referring to FIG. 8 and FIG. 9, the second polarization modulator 430 may include a second liquid crystal phase modulator and a linear polarizer 438. The linear polarizer 438 is provided on a side of the second liquid crystal phase modulator away from the display panel 100, namely, the linear polarizer 438 is provided on a side of the second liquid crystal phase modulator close to the lens layer 200. The second liquid crystal phase modulator is used to modulate the polarization states of the light passing through the first polarization modulator 410. The linear polarizer 438 is used make the light modulated by the second liquid crystal phase modulator pass through or block the light modulated by the second liquid crystal phase modulator. The linear polarizer 438 may be an S linear polarizer in a S direction, or a P linear polarizer in a P direction.

The specific structure of the second liquid crystal phase modulator can be the same as the specific structure of the first liquid crystal phase modulator, and details are omitted here.

The working principle of the second polarization modulator 430 will be described below by taking the first convergent lens 201 and the linear polarizer 438 (which is an S linear polarizer in the S direction) as an example.

Referring to FIG. 8, when the incident light is S-polarized light, and the second liquid crystal phase modulator is electronically controlled to be zero phase modulation, the light directly passes through the S linear polarizer as the S-polarized light and then is acted by the first convergent lens 201. If the second liquid crystal phase modulator is electronically controlled to be λ/2 phase, the incident light is rotated from S-polarized light to P-polarized light, and cannot be transmitted due to the blocking of the S linear polarizer directly above. Referring to FIG. 9, when the incident light is P-polarized light, if the second liquid crystal phase modulator is electrically controlled to be 0 phase modulation, the light is directly emitted as P-polarized light, and is blocked when the light reaches the S linear polarizer, and thus the light cannot be transmitted out. If the second liquid crystal phase modulator is electrically controlled to be λ/2 phase, the incident light will be rotated from P-polarized light to S polarized light. Since the S linear polarizer is directly above the second polarization modulator, the light can pass through the S linear polarizer and go to the surface of the first convergent lens 201. Although S-polarized light is emitted from the surface of the first convergent lens 201 in both cases, the selection of the polarization state of the light incident on the first convergent lens 201 is realized, and under the effect of phase modulation at the same time, only light of one polarization state can be transmitted, and light of the other polarization state is absorbed.

In addition, in other example embodiments of the present disclosure, the 3D display device may further include a first polarization modulator 410 and a polarizer. The first polarization modulator 410 is provided on the light exit side of the display panel 100. The first polarization modulator 410 includes a plurality of first modulation units arranged in an array. One subpixel of the display panel 100 corresponds to one first modulation unit of the first polarization modulator 410. The first modulation units are used to modulate the polarization states of the light emitted by subpixels. The structure of the first polarization modulator 410 is the same as that in the above exemplary embodiments, and details will be omitted here.

In some exemplary embodiments, each convergent lens may be a liquid crystal convergent lens 600, and the liquid crystal convergent lens 600 can achieve light deflection while modulating the polarization states of the light. That is, the second liquid crystal phase modulator may be replaced by the liquid crystal convergent lens 600, and the linear polarizer is arranged on a side of the lens layer 200 away from the display panel 100.

Figure 10:
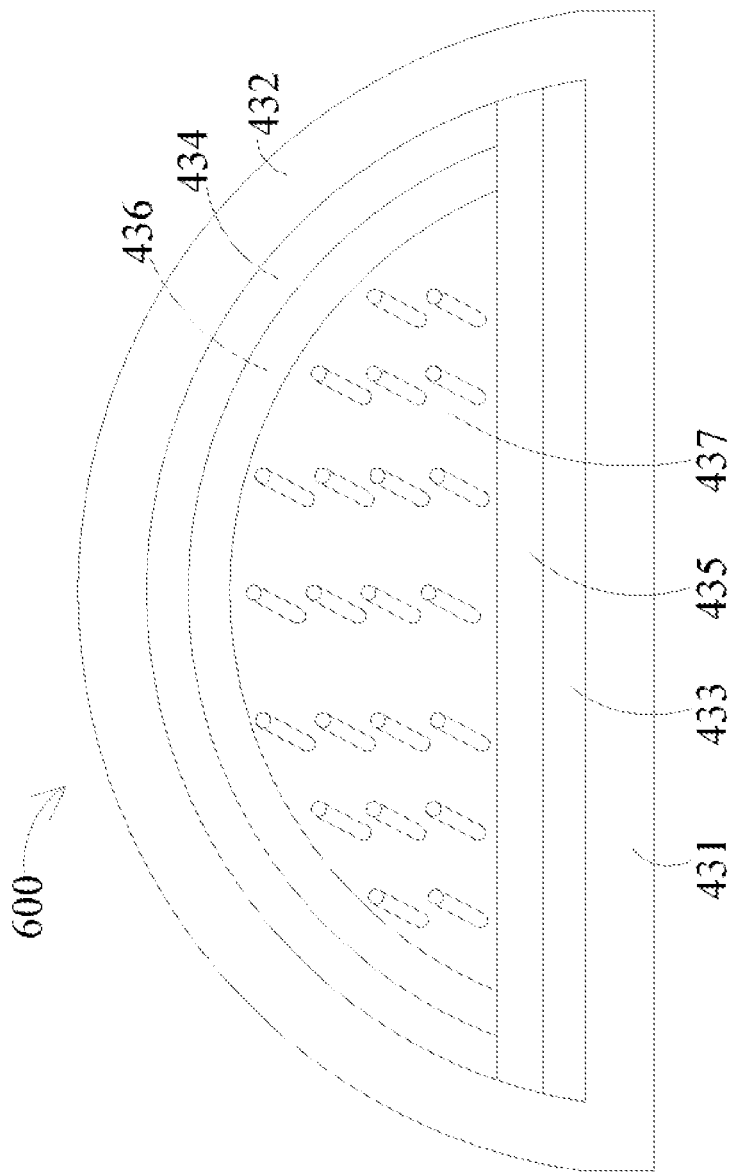
FIG. 10 is a schematic diagram showing the structure of a liquid crystal convergent lens.

Referring to FIG. 10, the specific structure of the liquid crystal convergent lens 600 is as follows.

The liquid crystal convergent lens 600 includes a liquid crystal layer 437, a third glass substrate 431, a fourth glass substrate 432, a third electrode plate 433, a fourth electrode plate 434, a third alignment layer 435 and a fourth alignment layer 436. The third glass substrate 431 is arranged in a flat plate shape, the fourth glass substrate 432 is arranged in an arc shape, and the third glass substrate 431 and the fourth glass substrate 432 are arranged oppositely and connected as a whole to form a housing of the liquid crystal convergent lens 600. The third electrode plate 433 is disposed on a side of the third glass substrate 431 close to the fourth glass substrate 432, the fourth electrode plate 434 is disposed on a side of the fourth glass substrate 432 close to the third glass substrate 431, and the fourth electrode plate 434 is arranged in an arc shape matching the fourth glass substrate 432, and the third electrode plate 433 and the fourth electrode plate 434 are not connected. The third alignment layer 435 is disposed on a side of the third electrode plate 433 away from the third glass substrate 431, and the fourth alignment layer 436 is disposed on a side of the fourth electrode plate 434 away from the fourth glass substrate 432. The liquid crystal layer 437 is provided between the third alignment layer 435 and the fourth alignment layer 436. Such a configuration can reduce the thickness of the 3D display device, reduce the weight of the 3D display device, and is benefit for a thinner and lighter design.

Figure 11:
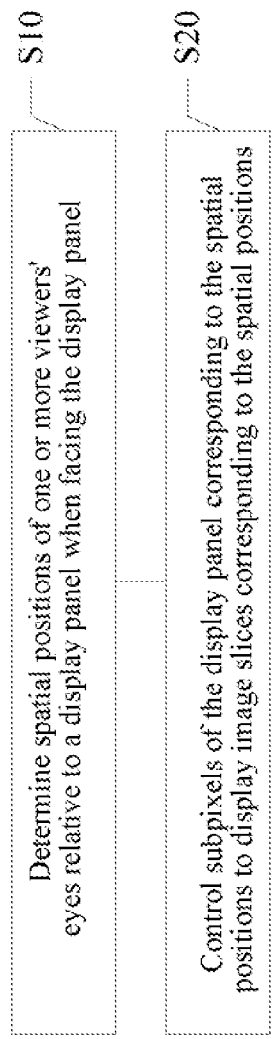
FIG. 11 is a schematic flowchart of a display method of a 3D display device according to an exemplary embodiment of the present disclosure.

Further, an exemplary embodiment also provides a display method of a 3D display device, and the display method is applied to any of the above-mentioned 3D display devices. FIG. 11 is schematic flowchart of the display method. The display method may include the following steps:

In step S10, spatial positions of one or more viewers' eyes relative to a display panel 100 when facing the display panel 100 are determined.

In step S20, subpixels of the display panel corresponding to the spatial positions are controlled to display image slices corresponding to the spatial positions.

In embodiments of the present disclosure, a spatial position refers to a viewing zone order number and a view number. The determination of the viewing zone order number and the view number has been described in detail above, and repeated descriptions will be omitted here. Each 3D display device stores viewing zones and view coordinate areas.

After a camera acquires the face image of the viewer, the camera acquires the coordinate points of the viewer's eyes relative to the display panel 100 through image processing, and compares the coordinate points with the viewing zones and the view coordinate areas. If the area which the coordinate points falls in is determined, it is possible to determine the viewing zone order numbers and view numbers of the viewer's eyes.

There is a one-to-one correspondence between the view numbers and the image slices. For example, the spatial positions of the human eye are the first view in the +1 order viewing zone and the fourth view in the +2 order viewing zone, and the image slice corresponding to the first view in the +1 order viewing zone is the fifth image slice, and the image slice corresponding to the fourth view in the +2 order viewing zone is the fourth image slice. The driver of the display panel 100 controls the fourth subpixel d of each pixel group to display the fourth image slice, so that the image seen by the viewer's right eye is the fourth image slice, and the driver of the display panel 100 controls the first subpixel a of each pixel group to display the fifth image slice, so that the image seen by the viewer's left eye is the fifth image slice. There is no visual jump between the fourth image slice and the fifth image slice. Therefore, the viewer's eyes can always see the corresponding image slices without visual jump.

The above describes the exemplary implementation of viewing 3D display device by one viewer. In the case where the 3D display device is provided with the polarization modulation member 400, the 3D display device can also be applied to 3D viewing by two or three viewers at the same time. In the following description, two viewers (the first viewer G1 and the second viewer G2) will be described in detail as an example.

First, the spatial positions of the first viewer G1 and the second viewer G2 are obtained.

At least two spatial positions of at least two viewers' eyes relative to the display panel 100 when facing the display panel 100 are determined, the at least two spatial positions correspond to at least two moments within a preset time period one to one.

The preset time period is smaller than the refresh time of human vision. The two moments are a first moment t1 and a second moment t2, and the time interval between the first moment t1 and the second moment t2 is smaller than the refresh time of human vision. At the first moment t1, first spatial positions of eyes of a first viewer G1 relative to the display panel 100 when the eyes of the first viewer G1 face the display panel 100. At the second moment t2, second spatial positions of eyes of a second viewer G2 relative to the display panel 100 when the eyes of the second viewer G2 face the display panel.

In the case of two viewers, since the spatial positions of the first viewer G1 and the second viewer G2 are different, the image slices viewed by the first viewer G1 and the image slices viewed by the second viewer G2 are different, the light entering the eyes of the first viewer G1 cannot enter the eyes of the second viewer G2, and the light entering the eyes of the second viewer G2 cannot enter the eyes of the first viewer G1. Therefore, the polarization modulation member 400 needs to be used to adjust the light emitted by each subpixel.

After the first spatial positions are determined, subpixels corresponding to the first spatial positions of the display panel 100 are controlled to start to display image slices corresponding to the first spatial positions at the first moment, and according to the first spatial positions, polarization modulation states of the polarization modulation member are adjusted by the polarization module member 400 to make light from the subpixels corresponding to the first spatial positions pass through the polarization modulation member at the first moment, so that the light is incident only onto the first viewer G1.

After the second spatial positions are determined, subpixels corresponding to the second spatial positions of the display panel 100 are controlled to start to display image slices corresponding to the second spatial positions at the second moment, and according to the second spatial positions, the polarization modulation member 400 adjusts the polarization modulation states of the polarization modulation member to make light from the subpixels corresponding to the second spatial positions pass through the polarization modulation member at the second moment, so that the light is incident only onto the second viewer G2.

The following provides four example implementations to specifically describe the situation where two viewers view the 3D display device at the same time. In the following four example implementations, a naked-eye 3D display with four views in one viewing zone is taken as an example. The display panel 100 has five pixel groups, which include a first pixel group 110, a second pixel group 120, a third pixel group 130, a fourth pixel group 140 and a fifth pixel group 150 sequentially from left to right. The lens layer 200 has nine convergent lenses which include a first convergent lens 201, a second convergent lens 202, a third convergent lens 203, a fourth convergent lens 204, a fifth convergent lens 205, a sixth convergent lens 206, a seventh convergent lens 207, an eighth condenser lens 208 and a ninth condenser lens 209 arranged sequentially from left to right. The corresponding second liquid crystal phase modulators include a No. 1 second modulation unit 441, a No. 2 second modulation unit 442, a No. 3 second modulation unit 443, a No. 4 second modulation unit 444, a No. 5 second modulation unit 445, a No. 6 second modulation unit 446, a Nol. 7 second modulation unit 447, a No. 8 second modulation unit 448, and a No. 9 second modulation unit 449 arranged sequentially from left to right.

If the first spatial positions and the second spatial positions are located in adjacent viewing zones, the polarization modulation states of the second modulation units of the second polarization modulator are arranged alternately.

Figure 12:
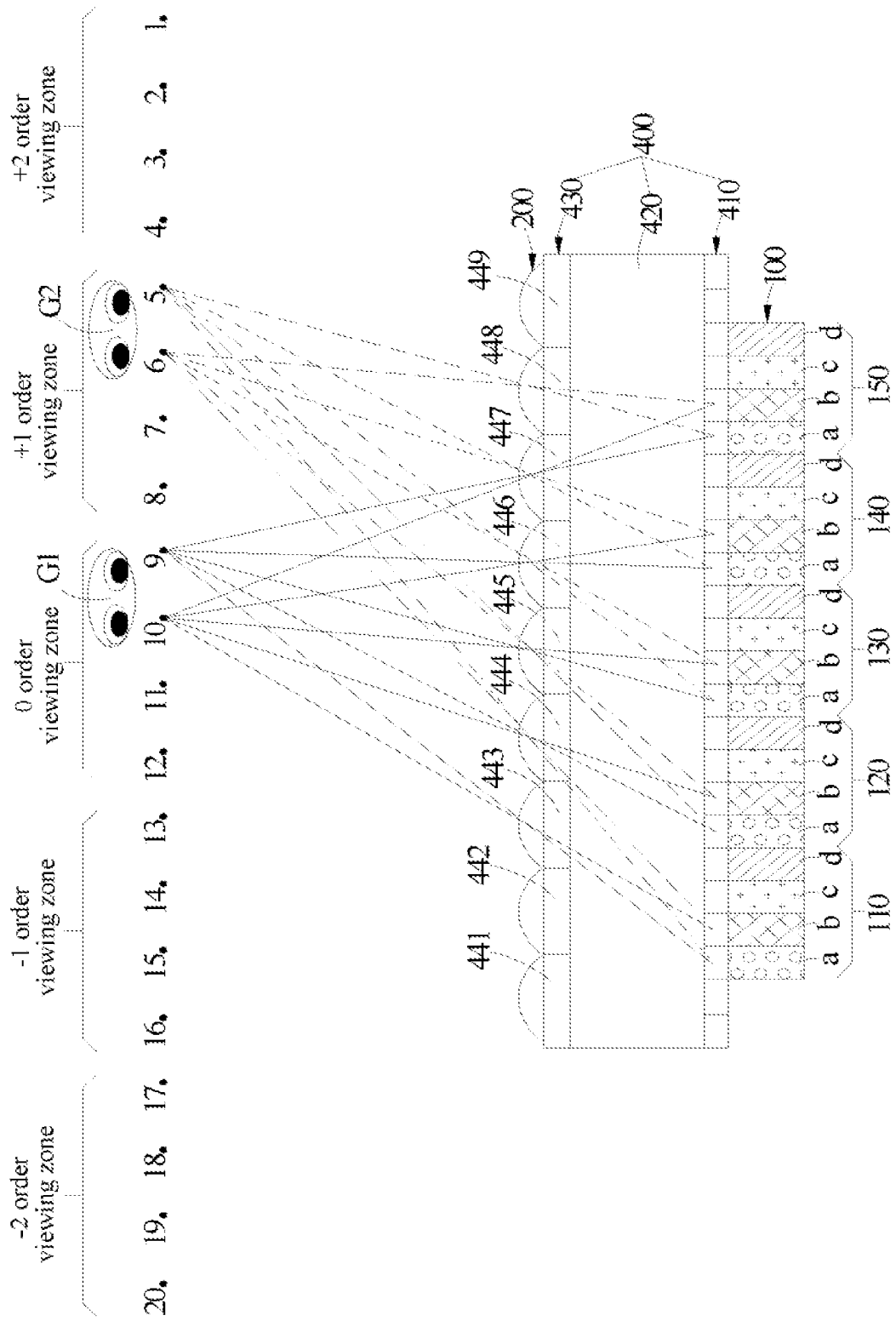
FIG. 12 is a schematic diagram showing the optical path in a first exemplary implementation of the display method of the 3D display device of the present disclosure.

Referring to FIG. 12, at the first moment t1, it is determined that the spatial positions of the eyes of the first viewer G1 with respect to the display panel 100 when facing the display panel 100 are the ninth and tenth views. The right eye of the first viewer G1 is located at the ninth view, the left eye of the first viewer G1 is located at the tenth view. Both the ninth view and the tenth view are located in the 0 order viewing zone of the display panel 100. The ninth view corresponds to the first subpixel a of each pixel group of the display panel 100. The display panel 100 controls the first subpixel a of each pixel group to start to display the ninth image slice corresponding to the ninth view at the first moment t1. The tenth view corresponds to the second subpixel b of each pixel group of the display panel 100, and the display panel 100 controls the second subpixel b of each pixel group to start to display the tenth image slice corresponding to the tenth view at the first moment t1.

At the second moment t2, it is determined that the spatial positions of the eyes of the second viewer G2 with respect to the display panel 100 when facing the display panel 100 are the fifth and sixth views. The right eye of the second viewer G2 is located at the fifth view, the left eye of the second viewer G2 is located at the sixth view. Both the sixth view and the ninth view are located in the +1 order viewing zone of the display panel 100. The fifth view corresponds to the first subpixel a of each pixel group of the display panel 100. The display panel 100 controls the first subpixel a of each pixel group to start to display the fifth image slice corresponding to the fifth view at the second moment t2. The sixth view corresponds to the second subpixel b of each pixel group of the display panel 100, and the display panel 100 controls the second subpixel b of each pixel group to start to display the sixth image slice corresponding to the sixth view at the second moment t2.

The difference in positions of the convergent lens through which light from a subpixel enters into the first viewer G1 and the convergent lens through which light from the subpixel enters into the second viewer G2 is one, and thus polarization modulation states of the second modulation units need to be arranged alternately, that is, one second modulation unit is provided between second modulation units of the same polarization modulation state. As shown in Table 1, the polarization modulation states of the nine second modulation units are arranged as: 0-λ/2-0-λ/2-0-λ/2-0-λ/2-0 (0 represents the 0 phase modulation and the light does not experience any transformation; λ/2 represents the λ/2 phase modulation, the light is converted from a first polarization state to a second polarization state, the first polarization state is perpendicular to the second polarization state, for example, the S polarization state is converted to the P polarization state, or the P polarization state is converted to the S polarization state). In this way, it can be ensured that the light can only enter the eyes of one viewer at the same time, and only one viewer can see the corresponding view.

In addition, since the polarizer in some exemplary embodiments is an S polarizer, only S-polarized light can finally pass through a convergent lens to reach the human eyes. Therefore, the states of modulation on the pixel groups performed by the first liquid crystal phase modulator should also be set at intervals. As shown in Table 2, the states of modulation on the first pixel group 110 to the fifth pixel group 150 performed by the first liquid crystal phase modulator at the moment t1 corresponds to S-P-S-P-S.

Moreover, states of light emitted from a same subpixel after modulation by the first liquid crystal phase modulator at the first moment t1 and the second moment t2 are opposite. For example, at the first moment, the first liquid crystal phase modulator modulates the light emitted by the first subpixel a and the second subpixel b in each pixel group so that the emitted light is S-polarized light; and at the second moment, the first liquid crystal phase modulator modulates the light emitted by the first subpixel a and the second subpixel b in each pixel group so that the emitted light is P-polarized light. The states of modulation on the first pixel group 110 to the fifth pixel group 150 performed by the first liquid crystal phase modulator at the moment t2 are: P-S-P-S-P. Table 2 shows the polarization states of light from the subpixels after modulated by the first liquid crystal phase modulator at the first moment t1 and second moment t2 and the image slices displayed by the subpixles. In the table, 110-a represents the first subpixel a in the first pixel group 110, and the meaning of the other reference signs can be deduced by analogy, which will not be repeated here.

TABLE 1

| numbers of second modulation units | 441 | 442 | 443 | 444 | 445 | 446 | 447 | 448 | 449 |
|---|---|---|---|---|---|---|---|---|---|
| polarization modulation states | 0 | λ/2 | 0 | λ/2 | 0 | λ/2 | 0 | λ/2 | 0 |

TABLE 2

| subpixels | | 110-a | 110-b | 120-a | 120-b | 130-a | 130-b | 140-a | 140-b | 140-a | 140-b |
|---|---|---|---|---|---|---|---|---|---|---|---|
| moment t1 | image slices | 9 | 10 | 9 | 10 | 9 | 10 | 9 | 10 | 9 | 10 |
| | polarization states | S | S | P | P | S | S | P | P | S | S |
| moment t2 | image slices | 5 | 6 | 5 | 6 | 5 | 6 | 5 | 6 | 5 | 6 |
| | polarization states | P | P | S | S | P | P | S | S | P | P |

The specific display procedure is as follows. At the first moment t1, the first liquid crystal phase modulator modulates the light emitted from the first pixel group 110 to the fifth pixel group 150 as: S-polarized light, P-polarized light, S-polarized light, P-polarized light, and S-polarized light. The light passes through the transparent substrate to the second liquid crystal phase modulator. The light from the first pixel group 110 passes through the No. 3 second modulation unit 443. The light from the third pixel group 130 passes through the No. 5 second modulation unit 445. The light from the fifth pixel group 150 passes through the No. 7 second modulation unit 447. The No. 3 second modulation unit 443, the No. 5 second modulation unit 445, and the No. 7 second modulation unit 447 are all zero phase modulation, so that the light travels out from the second liquid crystal phase modulator with the original S polarization state, and then goes from the S polarizer to the convergent lenses. The light from the second pixel group 120 passes through the No. 4 second modulation unit 444. The light from the fourth pixel group 140 passes through the No.

6 second modulation unit 446. The No. 4 second modulation unit 444 and the No. 6 second modulation unit 446 are both λ/2 phase modulation, by which the P-polarized light is modulated as S-polarized light, and then the light travels from the S polarizer to a convergent lens. The above five groups of light rays are converged to the ninth view and the tenth view after passing through the convergent lenses to realize the 3D display.

The light from the first pixel group 110 can reach the No. 4 second modulation unit 444, the light from the third pixel group 130 can reach the No. 6 second modulation unit 446, and the light from the fifth pixel group 150 can reach the No. 8 second modulation unit 448. But, the No. 4 second modulation unit 444, the No. 6 second modulation unit 446, and the No. 8 second modulation unit 448 are all λ/2 phase modulation, which will change the S-polarized light that is emitted from the first pixel group 110, the third pixel group 130 and the fifth pixel group 150 and passes through the first liquid crystal phase modulator into P-polarized light, and the P-polarized light cannot travel to the convergent lenses through the S-polarizer. This prevents the S-polarized light from the first pixel group 110, the third pixel group 130, and the fifth pixel group 150 from entering into the eyes of the second viewer G2 at the first moment t1. The light from the second pixel group 120 can reach the No. 5 second modulation unit 445. The light from the fourth pixel group 140 can reach the No. 7 second modulation unit 447. But, the No. 5 second modulation unit 445 and the No. 7 two modulation units 447 are both 0 phase modulation, and will not modulate the P-polarized light emitted from the second pixel group 120 and the fourth pixel group 140 through the first liquid crystal phase modulator, and the P-polarized light cannot travel through the S polarizer to reach the convergent lenses. This prevents the P-polarized light from the second pixel group 120 and the fourth pixel group 140 from entering into the eyes of the second viewer G2 at the first moment t1.

At the second moment t2, the light represented by the dotted lines in the figures. The first liquid crystal phase modulator modulates the light emitted from the first pixel group 110 to the fifth pixel group 150 as: P-polarized light, S-polarized light, P-polarized light, S-polarized light, and P-polarized light. The light travels to the second modulation units through the transparent substrate. The light from the first pixel group 110 passes through the No. 4 second modulation unit 444. The light from the third pixel group 130 passes through the No. 6 second modulation unit 446. The light from the fifth pixel group 150 passes through the No. 8 second modulation unit 448. The No. 4 second modulation unit 444, the No. 6 second modulation unit 446, and the No. 8 second modulation unit 448 all perform λ/2 phase modulations, by which the P-polarized light is modulated into S-polarized light, and then the light travels from the S polarizer to the convergent lenses. The light from the second pixel group 120 passes through the No. 5 second modulation unit 445. The light from the fourth pixel group 140 passes through the No. 7 second modulation unit 447. The No. 5 second modulation unit 445 and the No. 7 second modulation unit 447 both perform 0 phase modulations, so that the light still travels out of the second modulation units with the original S polarization state, and then goes from the S polarizer to the convergent lenses. The above-mentioned five groups of light rays are converged to the fifth view and the sixth view after passing through the convergent lenses, so as to realize the 3D display.

The light from the first pixel group 110 can reach the No. 3 second modulation unit 443, the light from the third pixel group 130 can reach the No. 5 second modulation unit 445, and the light from the fifth pixel group 150 can reach the No. 7 second modulation unit 447. But, the No. 3 second modulation unit 443, the No. 5 second modulation unit 445, and the No. 7 second modulation unit 447 all perform 0 phase modulations, and will not modulate the P-polarized light emitted from the first pixel group 110, the third pixel group 130 and the fifth pixel group 150 through the first liquid crystal phase modulator, and the P-polarized light cannot travel to the convergent lenses through the S polarizer. This prevents the P-polarized light from the first pixel group 110, the third pixel group 130, and the fifth pixel group 150 from entering into the eyes of the first viewer G1 at the second moment t2. The light from the second pixel group 120 can reach the No. 4 second modulation unit 444, and the light from the fourth pixel group 140 can reach the No. 6 second modulation unit 446. But, the No. 4 second modulation unit 444 and the No. 6 second modulation unit 446 both perform λ/2 phase modulations, which modulate the S-polarized light emitted by the second pixel group 120 and the fourth pixel group 140 through the first liquid crystal phase modulator into P-polarized light. The P-polarized light cannot travel through the S polarizer to the convergent lenses. This prevents the S-polarized light from the second pixel group 120 and the fourth pixel group 140 from entering into the eyes of the first viewer G1 at the second moment t2.

In this way, viewing of 3D display images by two viewers is realized, and the two viewers do not interfere with each other.

In other exemplary embodiments of the present disclosure, as shown in Table 3, the arrangement of the nine second modulation units may be: λ/2-0-λ/2-0-λ/2-0-λ/2-0-λ/2. In this case, as shown in Table 4, at the first moment t1, the first liquid crystal phase modulator modulates the light emitted from the first pixel group 110 to the fifth pixel group 150 as: P-polarized light, S-polarized light, P-polarized light, S-polarized light, and P-polarized light. At the second moment t2, the first liquid crystal phase modulator modulates the light emitted from the first pixel group 110 to the fifth pixel group 150 as: S-polarized light, P-polarized light, S-polarized light, P-polarized light, and S-polarized light. The display principle is the same as the above described embodiments, and thus details are not provided here.

TABLE 3

| numbers of second modulation units | 441 | 442 | 443 | 444 | 445 | 446 | 447 | 448 | 449 |
|---|---|---|---|---|---|---|---|---|---|
| polarization modulation states | λ/2 | 0 | λ/2 | 0 | λ/2 | 0 | λ/2 | 0 | λ/2 |

TABLE 4

| | subpixels | 110-a | 110-b | 120-a | 120-b | 130-a | 130-b | 140-a | 140-b | 140-a | 140-b |
|---|---|---|---|---|---|---|---|---|---|---|---|
| moment t1 | image slices | 9 | 10 | 9 | 10 | 9 | 10 | 9 | 10 | 9 | 10 |
| | polarization states | P | P | S | S | P | P | S | S | P | P |

TABLE 4-continued

| | subpixels | 110-a | 110-b | 120-a | 120-b | 130-a | 130-b | 140-a | 140-b | 140-a | 140-b |
|---|---|---|---|---|---|---|---|---|---|---|---|
| moment t2 | image slices | 5 | 6 | 5 | 6 | 5 | 6 | 5 | 6 | 5 | 6 |
| | polarization states | S | S | P | P | S | S | P | P | S | S |

If the first spatial positions and the second spatial positions are in the viewing zones between which another viewing zone is provided, the polarization modulation states of the second modulation units of the second polarization modulator are arranged as: pairs of polarization modulation states are arranged alternately.

Figure 13:
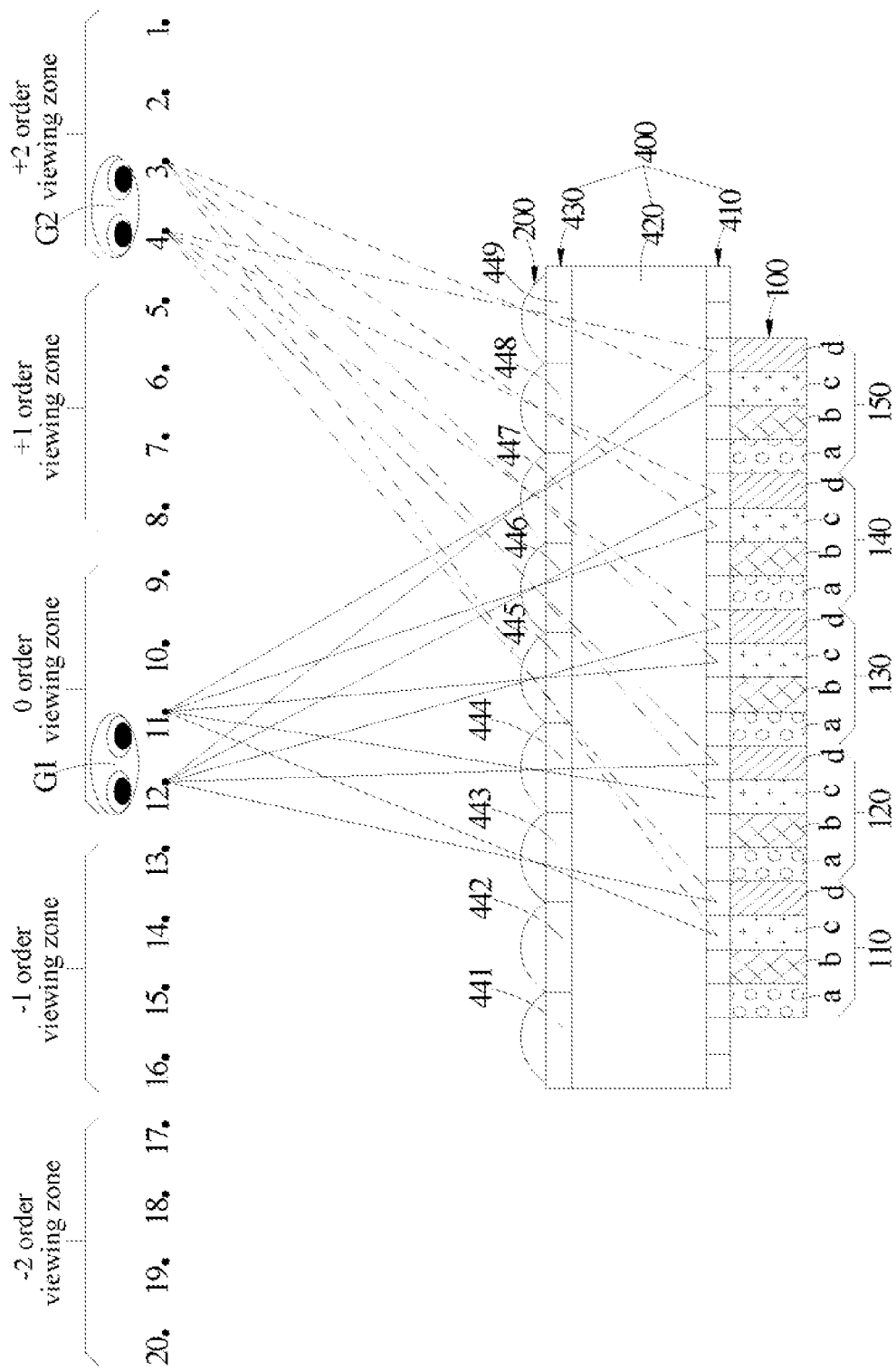
FIG. 13 is a schematic diagram showing the optical path in a second exemplary implementation of the display method of the 3D display device of the present disclosure.

Referring to the second exemplary implementation shown in FIG. 13, at the first moment t1, it is determined that the spatial positions of the eyes of the first viewer G1 with respect to the display panel 100 when facing the display panel 100 are the eleventh and twelfth views. The right eye of the first viewer G1 is located at the eleventh view, the left eye of the first viewer G1 is located at the twelfth view. Both the eleventh view and the twelfth view are located in the 0 order viewing zone of the display panel 100. The eleventh view corresponds to the third subpixel c of each pixel group of the display panel 100. The display panel 100 controls the third subpixel c of each pixel group to start to display the eleventh image slice corresponding to the eleventh view at the first moment t1. The twelfth view corresponds to the fourth subpixel d of each pixel group of the display panel 100, and the display panel 100 controls the fourth subpixel d of each pixel group to start to display the twelfth image slice corresponding to the twelfth view at the first moment t1.

At the second moment t2, it is determined that the spatial positions of the eyes of the second viewer G2 with respect to the display panel 100 when facing the display panel 100 are the third and fourth views. The right eye of the second viewer G2 is located at the third view, and the left eye of the second viewer G2 is located at the fourth view. Both the third view and the fourth view are located in the +2 order viewing zone of the display panel 100. The third view corresponds to the third subpixel c of each pixel group of the display panel 100. The display panel 100 controls the third subpixel a of each pixel group to start to display the third image slice corresponding to the third view at the second moment t2. The fourth view corresponds to the fourth subpixel d of each pixel group of the display panel 100, and the display panel 100 controls the fourth subpixel d of each pixel group to start to display the fourth image slice corresponding to the fourth view at the second moment t2.

The difference in the viewing zones where the first viewer G1 and the second viewer G2 are located is two, and the difference in positions of the convergent lens through which light from a subpixel enters into the first viewer G1 and the convergent lens through which light from the subpixel enters into the second viewer G2 is two. Thus, the arrangement of the polarization modulation states of the second liquid crystal phase modulator needs to be as follows: pairs of same polarization states are arranged alternately, that is, two second modulation units of a same polarization state are provided between second modulation units of another same polarization modulation state. As shown in Table 5, the polarization modulation states of the nine second modulation units are arranged as: 0-0-$\lambda/2$-$\lambda/2$-0-0-$\lambda/2$-$\lambda/2$-0. In this way, it can be ensured that the light can only enter the eyes of one viewer at the same time, and only one viewer can see the corresponding view.

In addition, since the polarizer in some exemplary embodiments is an S polarizer, only S-polarized light can finally pass through a convergent lens to reach the human eyes. Therefore, the states of modulation on the pixel groups performed by the first liquid crystal phase modulator should also be: pairs of same modulation states are arranged alternately. As shown in Table 6, the states of modulation on the first pixel group 110 to the fifth pixel group 150 performed by the first liquid crystal phase modulator at the moment t1 corresponds to P-P-S-S-P.

Moreover, states of light emitted from a same subpixel after modulation by the first liquid crystal phase modulator at the first moment t1 and the second moment t2 are opposite. For example, at the first moment t1, the first liquid crystal phase modulator modulates the light emitted by the third subpixel c and the fourth subpixel d in each pixel group so that the emitted light is P-polarized light; and at the second moment t2, the first liquid crystal phase modulator modulates the light emitted by the third subpixel c and the fourth subpixel d in each pixel group so that the emitted light is S-polarized light. The states of modulation for the first pixel group 110 to the fifth pixel group 150 performed by the first liquid crystal phase modulator at the moment t2 are: S-S-P-P-S. Table 6 shows the polarization states of light from the subpixels after modulated by the first liquid crystal phase modulator at the first moment t1 and the second moment t2 and the image slices displayed by the subpixles.

TABLE 5

| numbers of second modulation units | 441 | 442 | 443 | 444 | 445 | 446 | 447 | 448 | 449 |
|---|---|---|---|---|---|---|---|---|---|
| polarization modulation states | 0 | 0 | $\lambda/2$ | $\lambda/2$ | 0 | 0 | $\lambda/2$ | $\lambda/2$ | 0 |

TABLE 6

| | subpixels | 110-c | 110-d | 120-c | 120-d | 130-c | 130-d | 140-c | 140-d | 140-c | 140-d |
|---|---|---|---|---|---|---|---|---|---|---|---|
| moment t1 | image slices | 11 | 12 | 11 | 12 | 11 | 12 | 11 | 12 | 11 | 12 |
| | polarization states | P | P | P | P | S | S | S | S | P | P |

TABLE 6-continued

| subpixels | | 110-c | 110-d | 120-c | 120-d | 130-c | 130-d | 140-c | 140-d | 140-c | 140-d |
|---|---|---|---|---|---|---|---|---|---|---|---|
| moment t2 | image slices | 3 | 4 | 3 | 4 | 3 | 4 | 3 | 4 | 3 | 4 |
| | polarization states | S | S | S | S | P | P | P | P | S | S |

The specific display procedure is as follows. At the first moment t1, the first liquid crystal phase modulator modulates the light emitted from the first pixel group 110 to the fifth pixel group 150 as: P-polarized light, P-polarized light, S-polarized light, S-polarized light, and P-polarized light. The light passes through the transparent substrate and reach the second liquid crystal phase modulator. The light from the first pixel group 110 passes through the No. 3 second modulation unit 443. The light from the second pixel group 120 passes through the No. 4 second modulation unit 444. The light from the fifth pixel group 150 passes through the No. 7 second modulation unit 447. The No. 3 second modulation unit 443, the No. 4 second modulation unit 444, and the No. 7 second modulation unit 447 all perform $\lambda/2$ phase modulation, by which the P-polarized light is modulated as S-polarized light, and the modulated light travels from the S polarizer to the convergent lenses. The light from the third pixel group 130 passes through the No. 5 second modulation unit 445. The light from the fourth pixel group 140 passes through the No. 6 second modulation unit 446. The No. 5 second modulation unit 445 and the No. 6 second modulation unit 446 both perform 0 phase modulation, and the light travels out from the second liquid crystal phase modulator with the original S polarization state, and then goes from the S polarizer to the convergent lenses. The above five groups of light rays are converged to the eleventh view and the twelfth view after passing through the convergent lenses to realize the 3D display.

The light from the first pixel group 110 can reach the No. 5 second modulation unit 445, the light from the second pixel group 120 can reach the No. 6 second modulation unit 446, and the light from the fifth pixel group 150 can reach the No. 9 second modulation unit 449. But, the No. 5 second modulation unit 445, the No. 6 second modulation unit 446, and the No. 9 second modulation unit 448 all perform 0 phase modulation, which will not modulate the P-polarized light that is emitted from the first pixel group 110, the third pixel group 130 and the fifth pixel group 150 and passes through the first liquid crystal phase modulator, and the P-polarized light cannot travel to the convergent lenses through the S polarizer. This prevents the P-polarized light from the first pixel group 110, the third pixel group 130, and the fifth pixel group 150 from entering into the eyes of the second viewer G2 at the first moment t1. The light from the third pixel group 130 can reach the No. 7 second modulation unit 447. The light from the fourth pixel group 140 can reach the No. 8 second modulation unit 448. But, the No. 7 second modulation unit 447 and the No. 8 two modulation units 448 both perform $\lambda/2$ phase modulation, and will modulate the S-polarized light emitted from the third pixel group 130 and the fourth pixel group 140 through the first liquid crystal phase modulator as the P-polarized light, and the P-polarized light cannot travel through the S polarizer to reach the convergent lenses. This prevents the S-polarized light from the third pixel group 130 and the fourth pixel group 140 from entering into the eyes of the second viewer G2 at the first moment t1.

At the second moment t2, the first liquid crystal phase modulator modulates the light emitted from the first pixel group 110 to the fifth pixel group 150 as: S-polarized light, S-polarized light, P-polarized light, P-polarized light, and S-polarized light. The light travels to the second liquid crystal phase modulator through the transparent substrate. The light from the first pixel group 110 passes through the No. 5 second modulation unit 445. The light from the second pixel group 120 passes through the No. 6 second modulation unit 446. The light from the fifth pixel group 150 passes through the No. 9 second modulation unit 449. The No. 5 second modulation unit 445, the No. 6 second modulation unit 446, and the No. 9 second modulation unit 449 all perform 0 phase modulations, so that the light still travels out of the second liquid crystal phase modulator with the original S polarization state, and then goes from the S polarizer to the convergent lenses. The light from the third pixel group 130 passes through the No. 7 second modulation unit 447. The light from the fourth pixel group 140 passes through the No. 8 second modulation unit 448. The No. 7 second modulation unit 447 and the No. 8 second modulation unit 448 both perform $\lambda/2$ phase modulations, by which the P-polarized light is modulated into S-polarized light, and then the light travels from the S polarizer to the convergent lenses. The above-mentioned five groups of light rays are converged to the third view and the fourth view after passing through the convergent lenses, so as to realize the 3D display.

The light from the first pixel group 110 can reach the No. 3 second modulation unit 443, the light from the second pixel group 120 can reach the No. 4 second modulation unit 444, and the light from the fifth pixel group 150 can reach the No. 7 second modulation unit 447. But, the No. 3 second modulation unit 443, the No. 4 second modulation unit 444, and the No. 7 second modulation unit 447 all perform $\lambda/2$ phase modulations, which modulate the S-polarized light into P-polarized light, and the P-polarized light cannot travel through the S polarizer to reach the convergent lenses. This prevents the S-polarized light from the first pixel group 110, the third pixel group 130, and the fifth pixel group 150 from entering into the eyes of the first viewer G1 at the second moment t2. The light from the third pixel group 130 can reach the No. 5 second modulation unit 445, and the light from the fourth pixel group 140 can reach the No. 6 second modulation unit 446. But, the No. 5 second modulation unit 445 and the No. 6 second modulation unit 446 both perform 0 phase modulations, and will not modulate the P-polarized light emitted from the third pixel group 130 and the fourth pixel group 140 through the first liquid crystal phase modulator, and the P-polarized light cannot travel through the S polarizer to reach the convergent lenses. This prevents the P-polarized light from the third pixel group 130 and the fourth pixel group 140 from entering into the eyes of the first viewer G1 at the second moment t2.

In this way, viewing of 3D display images by two viewers is realized, and the two viewers do not interfere with each other.

In other exemplary embodiments of the present disclosure, as shown in Table 7, the arrangement of the nine second modulation units may be: $\lambda/2$-$\lambda/2$-0-0-$\lambda/2$-k/2-0-0-$\lambda/2$. In this case, as shown in Table 8, at the first moment t1, the first liquid crystal phase modulator modulates the light emitted from the first pixel group 110 to the fifth pixel group 150 as: S-polarized light, S-polarized light, P-polarized light, P-polarized light, and S-polarized light. At the second moment t2, the first liquid crystal phase modulator modulates the light emitted from the first pixel group 110 to the fifth pixel group 150 as: P-polarized light, P-polarized light, S-polarized light, S-polarized light, and P-polarized light. The display principle is the same as the above described embodiments, and thus details are not provided here.

TABLE 7

| numbers of second modulation units | 441 | 442 | 443 | 444 | 445 | 446 | 447 | 448 | 449 |
|---|---|---|---|---|---|---|---|---|---|
| polarization modulation states | $\lambda/2$ | $\lambda/2$ | 0 | 0 | $\lambda/2$ | $\lambda/2$ | 0 | 0 | $\lambda/2$ |

TABLE 8

| | subpixels | 110-c | 110-d | 120-c | 120-d | 130-c | 130-d | 140-c | 140-d | 140-c | 140-d |
|---|---|---|---|---|---|---|---|---|---|---|---|
| moment t1 | image slices | 11 | 12 | 11 | 12 | 11 | 12 | 11 | 12 | 11 | 12 |
| | polarization states | S | S | S | S | P | P | P | P | S | S |
| moment t2 | image slices | 3 | 4 | 3 | 4 | 3 | 4 | 3 | 4 | 3 | 4 |
| | polarization states | P | P | P | P | S | S | S | S | P | P |

If the first spatial positions and the second spatial positions span two viewing zones and the difference between the first spatial positions and the second spatial positions is one viewing zone, the polarization modulation states of the second modulation units of the second polarization modulator are arranged alternately.

Figure 14:
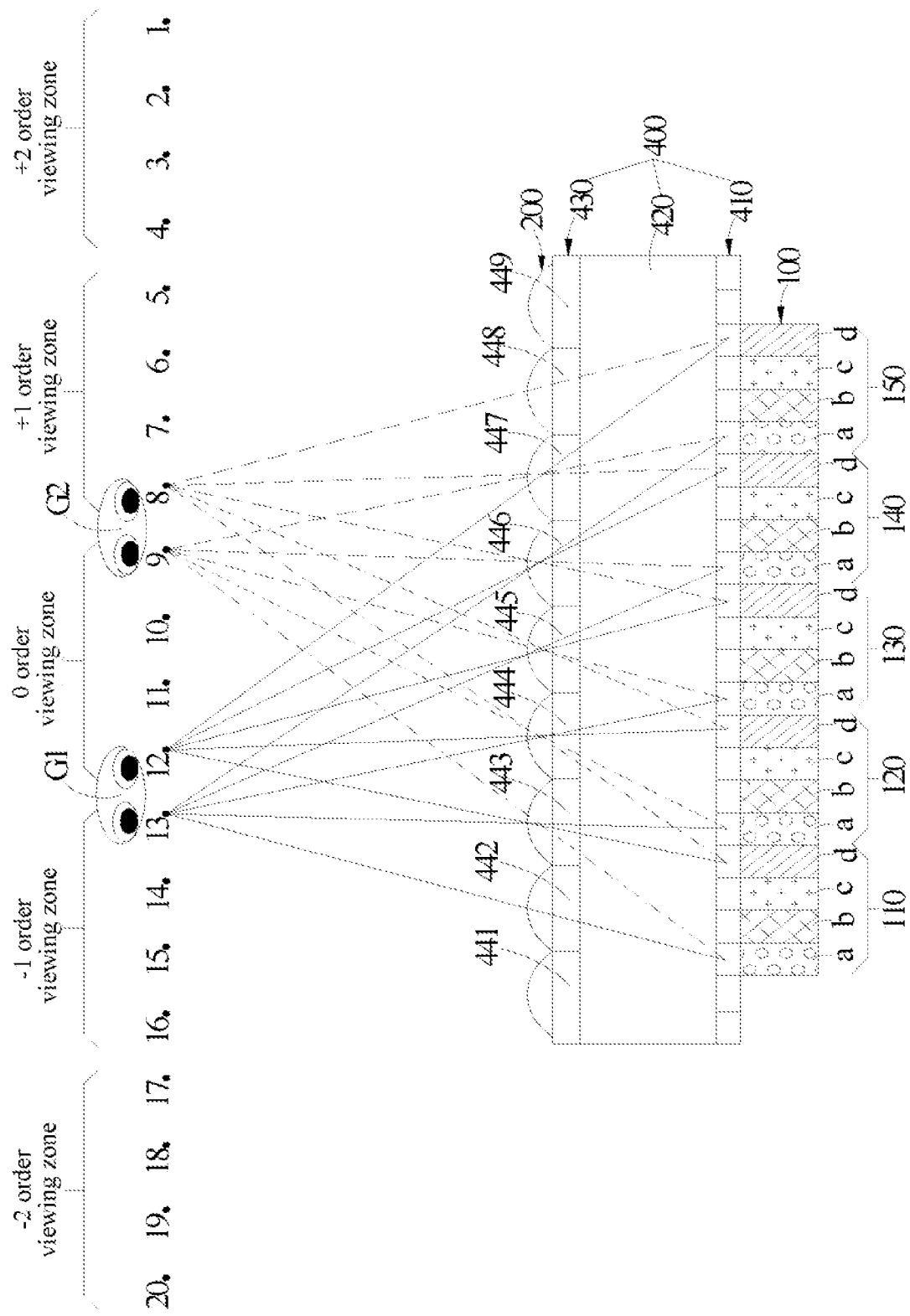
FIG. 14 is a schematic diagram showing the optical path in a third exemplary implementation of the display method of the 3D display device of the present disclosure.

Referring to the third exemplary implementation shown in FIG. 14, at the first moment t1, it is determined that the spatial positions of the eyes of the first viewer G1 with respect to the display panel 100 when facing the display panel 100 are the twelfth and thirteenth views. The right eye of the first viewer G1 is located at the twelfth view, the left eye of the first viewer G1 is located at the thirteen view. The twelfth view is located in the 0 order viewing zone of the display panel 100, and the thirteenth view is located in the −1 order viewing zone of the display panel 100. The first viewer G1 is at the border of the viewing zones. The twelfth view corresponds to the fourth subpixel d of each pixel group of the display panel 100, and the display panel 100 controls the fourth subpixel d of each pixel group to start to display the twelfth image slice corresponding to the twelfth view at the first moment t1. The thirteenth view corresponds to the first subpixel a of each pixel group of the display panel 100, and the display panel 100 controls the first subpixel a of each pixel group to start to display the thirteenth image slice corresponding to the thirteenth view at the first moment t1. In this way, there is no image jump in the images seen by the first viewer G1.

At the second moment t2, it is determined that the spatial positions of the eyes of the second viewer G2 with respect to the display panel 100 when facing the display panel 100 are the eighth and ninth views. The right eye of the second viewer G2 is located at the eighth view, and the left eye of the second viewer G2 is located at the ninth view. The eighth view is located in the +1 order viewing zone of the display panel 100, and the ninth view is located in the 0 order viewing zone of the display panel 100. The second viewer G2 is at the border of the viewing zones. The eighth view corresponds to the fourth subpixel d of each pixel group of the display panel 100, and the display panel 100 controls the fourth subpixel d of each pixel group to start to display the eighth image slice corresponding to the eighth view at the second moment t2. The ninth view corresponds to the first subpixel a of each pixel group of the display panel 100, and the display panel 100 controls the first subpixel a of each pixel group to start to display the ninth image slice corresponding to the ninth view at the second moment t2. In this way, there is no image jump in the images seen by the second viewer G2.

The difference in positions of the convergent lens through which light from a subpixel enters into the first viewer G1 and the convergent lens through which light from the subpixel enters into the second viewer G2 is one. Thus, the arrangement of the polarization modulation states of the second liquid crystal phase modulator need to be: the polarization states are arranged alternately, that is, one second modulation unit is provided between second modulation units of the same polarization modulation state. As shown in Table 9, the polarization modulation states of the nine second modulation units are arranged as: 0-$\lambda/2$-0-$\lambda/2$-0-$\lambda/2$-0-$\lambda/2$-0. In this way, it can be ensured that the light can only enter the eyes of one viewer at the same time, and only one viewer can see the corresponding view.

In addition, the polarizer in some exemplary embodiments is an S polarizer, only S-polarized light can finally pass through a convergent lens to reach the human eyes. Moreover, light from subpixels in the same pixel group needs to reach the same viewer by two adjacent modulation units. Therefore, the states of modulation for subpixels in each pixel groups performed by the first liquid crystal phase modulator should be opposite. Light from adjacent subpixels which are in two adjacent pixel groups, respectively, need to travel through one same second modulation unit to reach the same viewer. Thus, the states of modulation for the adjacent subpixels which are in two adjacent pixel groups, respectively, performed by the first liquid crystal phase modulator should be the same. As shown in Table 10, the states of modulation for the first pixel group 110 to the fifth pixel group 150 performed by the first liquid crystal phase modulator at the moment t1 corresponds to P-S-S-P-P-S-S-P-P-S.

Moreover, states of light emitted from a same subpixel after modulation by the first liquid crystal phase modulator at the first moment t1 and the second moment t2 are opposite. For example, at the first moment t1, the first liquid crystal phase modulator modulates the light emitted by the first subpixel a and the fourth subpixel d in each pixel group so that the emitted light is P-polarized light and S-polarized light; and at the second moment t2, the first liquid crystal phase modulator modulates the light emitted by the first subpixel a and the fourth subpixel d in each pixel group so that the emitted light is S-polarized light and P-polarized light. The states of modulation for the first pixel group 110 to the fifth pixel group 150 performed by the first liquid crystal phase modulator at the moment t2 are: S-P-P-S-S-P-P-S-S-P. Table 10 shows the polarization states of light from the subpixels after modulated by the first liquid crystal phase modulator at the first moment t1 and the second moment t2 and the image slices displayed by the subpixles.

TABLE 9

| numbers of second modulation units | 441 | 442 | 443 | 444 | 445 | 446 | 447 | 448 | 449 |
|---|---|---|---|---|---|---|---|---|---|
| polarization modulation states | 0 | λ/2 | 0 | λ/2 | 0 | λ/2 | 0 | λ/2 | 0 |

TABLE 10

| | subpixels | 110-a | 110-d | 120-a | 120-d | 130-a | 130-d | 140-a | 140-d | 140-a | 140-d |
|---|---|---|---|---|---|---|---|---|---|---|---|
| moment t1 | image slices | 13 | 12 | 13 | 12 | 13 | 12 | 13 | 12 | 13 | 12 |
| | polarization states | P | S | S | P | P | S | S | P | P | S |
| moment t2 | image slices | 9 | 8 | 9 | 8 | 9 | 8 | 9 | 8 | 9 | 8 |
| | polarization states | S | P | P | S | S | P | P | S | S | P |

The specific display procedure is as follows. At the first moment t1, the first liquid crystal phase modulator modulates the light emitted from the first subpixels a and the fourth subpixels d in the first pixel group 110 to the fifth pixel group 150 (a total of ten subpixels) as: P-polarized light, S-polarized light, S-polarized light, P-polarized light, P-polarized light, S-polarized light, S-polarized light, P-polarized light, P-polarized light, and S-polarized light. The light passes through the transparent substrate and reach the second liquid crystal phase modulator.

The light from the first subpixel a in the first pixel group 110 passes through the No. 2 second modulation unit 442. The light from the fourth subpixel d in the second pixel group 120 passes through the No. 4 second modulation unit 444. The light from the first subpixel a in the third pixel group 130 passes through the No. 4 second modulation unit 444. The light from the fourth subpixel d in the fourth pixel group 140 passes through the No. 6 second modulation unit 446. The light from the first subpixel a in the fifth pixel group 150 passes through the No. 6 second modulation unit 446. The No. 2 second modulation unit 442, the No. 4 second modulation unit 444, and the No. 6 second modulation unit 446 all perform λ/2 phase modulation, by which the P-polarized light is modulated as S-polarized light, and the modulated light travels from the S polarizer to the convergent lenses. The light from the fourth subpixel d in the first pixel group 110 passes through the No. 3 second modulation unit 443. The light from the first subpixel a in the second pixel group 120 passes through the No. 3 second modulation unit 443. The light from the fourth subpixel d in the third pixel group 130 passes through the No. 5 second modulation unit 445. The light from the first subpixel a in the fourth pixel group 140 passes through the No. 5 second modulation unit 445. The light from the fourth subpixel d in the fifth pixel group 140 passes through the No. 7 second modulation unit 447. The No. 3 second modulation unit 443, the No. 5 second modulation unit 445 and the No. 7 second modulation unit 447 all perform 0 phase modulation, and the light travels out from the second liquid crystal phase modulator with the original S polarization state, and then goes from the S polarizer to the convergent lenses. The above ten groups of light rays are converged to the twelfth view and the thirteenth view after passing through the convergent lenses to realize the 3D display.

The light from the first subpixel a in the first pixel group 110 can reach the No. 3 second modulation unit 443, the light from the fourth subpixel d in the second pixel group 120 can reach the No. 5 second modulation unit 445, the light from the first subpixel a in the third pixel group 130 can reach the No. 5 second modulation unit 445, the light from the fourth subpixel d in the fourth pixel group 140 can reach the No. 7 second modulation unit 447, and the light from the first subpixel a in the fifth pixel group 150 can reach the No. 7 second modulation unit 447. But, the No. 3 second modulation unit 443, the No. 5 second modulation unit 445, and the No. 7 second modulation unit 447 all perform 0 phase modulation, which will not modulate the P-polarized light that is emitted from the first liquid crystal phase modulator, and the P-polarized light cannot travel to the convergent lenses through the S polarizer. This prevents the P-polarized light from entering into the eyes of the second viewer G2 at the first moment t1.

In addition, the light from the fourth subpixel d in the first pixel group 110 can reach the No. 4 second modulation unit 444. The light from the first subpixel a in the second pixel group 120 can reach the No. 4 second modulation unit 444. The light from the fourth subpixel d in the third pixel group 130 can reach the No. 6 second modulation unit 446. The light from the first subpixel a in the fourth pixel group 140 can reach the No. 6 second modulation unit 446. The light from the fourth subpixel d in the fifth pixel group 150 can reach the No. 8 second modulation unit 448. But, the No. 4 second modulation unit 444, the No. 6 second modulation unit 446, and the No. 8 two modulation units 448 all perform λ/2 phase modulation, and will modulate the S-polarized light emitted from the first liquid crystal phase modulator as the P-polarized light, and the P-polarized light cannot travel through the S polarizer to reach the convergent lenses. This prevents the S-polarized light from entering into the eyes of the second viewer G2 at the first moment t1.

At the second moment t2, the first liquid crystal phase modulator modulates the light emitted from the first subpixels a and the fourth subpixels d in the first pixel group 110 to the fifth pixel group 150 (a total of ten subpixels) as:

S-polarized light, P-polarized light, P-polarized light, S-polarized light, S-polarized light, P-polarized light, P-polarized light, S-polarized light, S-polarized light, and P-polarized light. The light travels to the second liquid crystal phase modulator through the transparent substrate.

The light from the first subpixel a in the first pixel group 110 passes through the No. 3 second modulation unit 443. The light from the fourth subpixel d in the second pixel group 120 passes through the No. 5 second modulation unit 445. The light from the first subpixel a in the third pixel group 130 passes through the No. 5 second modulation unit 445. The light from the fourth subpixel d in the fourth pixel group 140 passes through the No. 7 second modulation unit 447. The light from the first subpixel a in the fifth pixel group 150 passes through the No. 7 second modulation unit 447. The No. 3 second modulation unit 443, the No. 5 second modulation unit 445, and the No. 7 second modulation unit 447 all perform 0 phase modulations, so that the light still travels out of the second liquid crystal phase modulator with the original S polarization state, and then goes from the S polarizer to the convergent lenses. The light from the fourth subpixel d in the first pixel group 110 passes through the No. 4 second modulation unit 444. The light from the first subpixel a in the second pixel group 120 passes through the No. 4 second modulation unit 444. The light from the fourth subpixel d in the third pixel group 130 passes through the No. 6 second modulation unit 446. The light from the first subpixel a in the fourth pixel group 140 passes through the No. 6 second modulation unit 446. The light from the fourth subpixel a in the fifth pixel group 150 passes through the No. 8 second modulation unit 448. The No. 4 second modulation unit 444, the No. 6 second modulation unit 446 and the No. 8 second modulation unit 447 all perform $\lambda/2$ phase modulations, by which the P-polarized light is modulated into S-polarized light, and then the light travels from the S polarizer to the convergent lenses. The above-mentioned ten groups of light rays are converged to the eighth view and the ninth view after passing through the convergent lenses, so as to realize the 3D display.

The light from the first subpixel a in the first pixel group 110 can reach the No. 2 second modulation unit 442, the light from the fourth subpixel d in the second pixel group 120 can reach the No. 4 second modulation unit 444, the light from the first subpixel a in the third pixel group 130 can reach the No. 4 second modulation unit 444, the light from the fourth subpixel d in the fourth pixel group 140 can reach the No. 6 second modulation unit 446, and the light from the first subpixel a in the fifth pixel group 150 can reach the No. 6 second modulation unit 446. But, the No. 2 second modulation unit 442, the No. 4 second modulation unit 444, and the No. 6 second modulation unit 446 all perform $\lambda/2$ phase modulations, which modulate the S-polarized light emitted from the first liquid crystal phase modulator into P-polarized light, and the P-polarized light cannot travel through the S polarizer to reach the convergent lenses. This prevents the S-polarized light from entering into the eyes of the first viewer G1 at the second moment t2.

The light from the fourth subpixel d in the first pixel group 110 can reach the No. 3 second modulation unit 443, the light from the first subpixel a in the second pixel group 120 can reach the No. 3 second modulation unit 443, the light from the fourth subpixel d in the third pixel group 130 can reach the No. 5 second modulation unit 445, the light from the first subpixel a in the fourth pixel group 140 can reach the No. 7 second modulation unit 447, and the light from the fourth subpixel d in the fifth pixel group 150 can reach the No. 7 second modulation unit 447. But, the No. 3 second modulation unit 443, the No. 5 second modulation unit 445 and the No. 7 second modulation unit 446 all perform 0 phase modulations, and will not modulate the P-polarized light emitted from the first liquid crystal phase modulator, and the P-polarized light cannot travel through the S polarizer to reach the convergent lenses. This prevents the P-polarized light from entering into the eyes of the first viewer G1 at the second moment t2.

In this way, viewing of 3D display images by two viewers is realized, and the two viewers do not interfere with each other.

In other exemplary embodiments of the present disclosure, as shown in Table 11, the arrangement of the nine second modulation units may be: $\lambda/2$-0-$\lambda/2$-0-$\lambda/2$-0-$\lambda/2$-0-$\lambda/2$. In this case, as shown in Table 12, at the first moment t1, the first liquid crystal phase modulator modulates the light emitted from the first subpixels a and fourth subpixels d in the first pixel group 110 to the fifth pixel group 150 (a total of ten subpixels) as: S-polarized light, P-polarized light, P-polarized light, S-polarized light, S-polarized light, P-polarized light, P-polarized light, S-polarized light, S-polarized light, and P-polarized light. At the second moment t2, the first liquid crystal phase modulator modulates the light emitted from the first subpixels a and the fourth subpixels d in the first pixel group 110 to the fifth pixel group 150 as: P-polarized light, S-polarized light, S-polarized light, P-polarized light, P-polarized light, S-polarized light, S-polarized light, P-polarized light, P-polarized light, and S-polarized light. The display principle is the same as the above described embodiments, and thus details are not provided here.

TABLE 11

| numbers of second modulation units | 441 | 442 | 443 | 444 | 445 | 446 | 447 | 448 | 449 |
|---|---|---|---|---|---|---|---|---|---|
| polarization modulation states | $\lambda/2$ | 0 | $\lambda/2$ | 0 | $\lambda/2$ | 0 | $\lambda/2$ | 0 | $\lambda/2$ |

TABLE 12

| | subpixels | 110-a | 110-d | 120-a | 120-d | 130-a | 130-d | 140-a | 140-d | 140-a | 140-d |
|---|---|---|---|---|---|---|---|---|---|---|---|
| moment t1 | image slices | 13 | 12 | 13 | 12 | 13 | 12 | 13 | 12 | 13 | 12 |
| | polarization states | S | P | P | S | S | P | P | S | S | P |
| moment t2 | image slices | 9 | 8 | 9 | 8 | 9 | 8 | 9 | 8 | 9 | 8 |
| | polarization states | P | S | S | P | P | S | S | P | P | S |

If the first spatial positions and the second spatial positions span two viewing zones and the difference between the first spatial positions and the second spatial positions is two viewing zones, the polarization modulation states of the second modulation units of the second polarization modulator as: pairs of polarization modulation states are alternately arranged.

Figure 15:
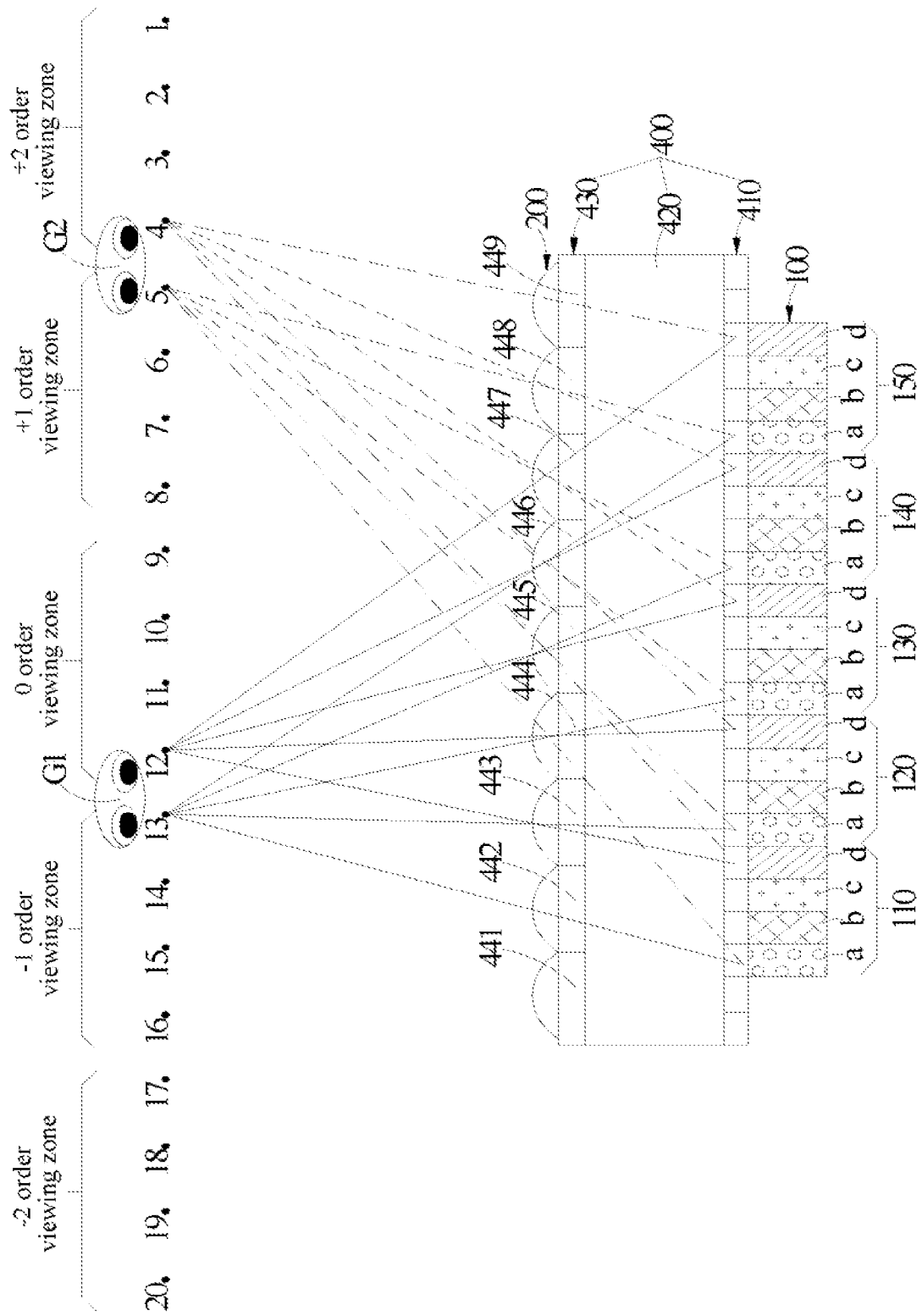
FIG. 15 is a schematic diagram showing the optical path in a fourth exemplary embodiment of the display method of the 3D display device of the present disclosure.

Referring to the fourth exemplary implementation shown in FIG. 15, at the first moment t1, it is determined that the spatial positions of the eyes of the first viewer G1 with respect to the display panel 100 when facing the display panel 100 are the twelfth and thirteenth views. The right eye of the first viewer G1 is located at the twelfth view, the left eye of the first viewer G1 is located at the thirteen view. The twelfth view is located in the 0 order viewing zone of the display panel 100, and the thirteenth view is located in the −1 order viewing zone of the display panel 100. The first viewer G1 is at the border of the viewing zones. The twelfth view corresponds to the fourth subpixel d of each pixel group of the display panel 100, and the display panel 100 controls the fourth subpixel d of each pixel group to start to display the twelfth image slice corresponding to the twelfth view at the first moment t1. The thirteenth view corresponds to the first subpixel a of each pixel group of the display panel 100, and the display panel 100 controls the first subpixel a of each pixel group to start to display the thirteenth image slice corresponding to the thirteenth view at the first moment t1. In this way, there is no image jump in the images seen by the first viewer G1.

At the second moment t2, it is determined that the spatial positions of the eyes of the second viewer G2 with respect to the display panel 100 when facing the display panel 100 are the fourth and fifth views. The right eye of the second viewer G2 is located at the fourth view, and the left eye of the second viewer G2 is located at the fifth view. The fourth view is located in the +2 order viewing zone of the display panel 100, and the fifth view is located in the +1 order viewing zone of the display panel 100. The second viewer G2 is at the border of the viewing zones. The fourth view corresponds to the fourth subpixel d of each pixel group of the display panel 100, and the display panel 100 controls the fourth subpixel d of each pixel group to start to display the fourth image slice corresponding to the fourth view at the second moment t2. The fifth view corresponds to the first subpixel a of each pixel group of the display panel 100, and the display panel 100 controls the first subpixel a of each pixel group to start to display the fifth image slice corresponding to the fifth view at the second moment t2. In this way, there is no image jump in the images seen by the second viewer G2.

The difference in positions of the convergent lens through which light from a subpixel enters into the first viewer G1 and the convergent lens through which light from the subpixel enters into the second viewer G2 is two. Thus, the arrangement of the polarization modulation states of the second liquid crystal phase modulator needs to be as follows: pairs of polarization states are arranged alternately, that is, two second modulation unit of the same polarization state is provided between second modulation units of another same polarization modulation state. As shown in Table 13, the phase modulations of the second modulation units are arranged as: 0-0-$\lambda$/2-$\lambda$/2-0-0-$\lambda$/2-$\lambda$/2-0. In this way, it can be ensured that the light can only enter the eyes of one viewer at the same time, and only one viewer can see the corresponding view.

In addition, the polarizer in some exemplary embodiments is an S polarizer, only S-polarized light can finally pass through a convergent lens to reach the human eyes. Moreover, light from adjacent subpixels which are in two adjacent pixel groups, respectively, need to travel through one same second modulation unit to reach the same viewer. Thus, the states of modulation for the adjacent subpixels which are in two adjacent pixel groups, respectively, performed by the first liquid crystal phase modulator should be the same. As shown in Table 14, the states of modulation for the first subpixels a and the fourth subpixels d in the first pixel group 110 to the fifth pixel group 150 performed by the first liquid crystal phase modulator at the moment t1 are: S-P-P-P-P-S-S-S-S-P.

Moreover, states of light emitted from a same subpixel after modulation by the first liquid crystal phase modulator at the first moment t1 and the second moment t2 are opposite. For example, at the first moment, the first liquid crystal phase modulator modulates the light emitted by the first subpixel a and the fourth subpixel d in each pixel group so that the emitted light is S-polarized light and P-polarized light; and at the second moment, the first liquid crystal phase modulator modulates the light emitted by the first subpixel a and the fourth subpixel d in each pixel group so that the emitted light is P-polarized light and S-polarized light. As shown in Table 14, the states of the modulation for the first pixel group 110 to the fifth pixel group 150 performed by the first liquid crystal phase modulator at the moment t2 are: P-S-S-S-S-P-P-P-P-P.

TABLE 13

| numbers of second modulation units | 441 | 442 | 443 | 444 | 445 | 446 | 447 | 448 | 449 |
|---|---|---|---|---|---|---|---|---|---|
| polarization modulation states | 0 | 0 | $\lambda$/2 | $\lambda$/2 | 0 | 0 | $\lambda$/2 | $\lambda$/2 | 0 |

TABLE 14

| | subpixels | 110-a | 110-d | 120-a | 120-d | 130-a | 130-d | 140-a | 140-d | 140-a | 140-d |
|---|---|---|---|---|---|---|---|---|---|---|---|
| moment t1 | image slices | 13 | 12 | 13 | 12 | 13 | 12 | 13 | 12 | 13 | 12 |
| | polarization states | S | P | P | P | P | S | S | S | S | P |
| moment t2 | image slices | 5 | 4 | 5 | 4 | 5 | 4 | 5 | 4 | 5 | 4 |
| | polarization states | P | S | S | S | S | P | P | P | P | S |

The specific display procedure is as follows. At the first moment t1, the first liquid crystal phase modulator modulates the light emitted from the first subpixels a and the fourth subpixels d in the first pixel group 110 to the fifth pixel group 150 (a total of ten subpixels) as: S-polarized light, P-polarized light, P-polarized light, P-polarized light, P-polarized light, S-polarized light, S-polarized light, S-polarized light, S-polarized light, and P-polarized light. The light passes through the transparent substrate and reach the second liquid crystal phase modulator.

The light from the first subpixel a in the first pixel group 110 passes through the No. 2 second modulation unit 442. The light from the fourth subpixel d in the third pixel group 130 passes through the No. 5 second modulation unit 445. The light from the first subpixel a in the fourth pixel group 140 passes through the No. 5 second modulation unit 445. The light from the fourth subpixel d in the fourth pixel group 140 passes through the No. 6 second modulation unit 446. The light from the first subpixel a in the fifth pixel group 150 passes through the No. 6 second modulation unit 446. The No. 2 second modulation unit 442, the No. 5 second modulation unit 445, and the No. 6 second modulation unit 446 all perform 0 phase modulation, so that the light travels out from the second liquid crystal phase modulator with the original S polarization state, and then goes from the S polarizer to the convergent lenses. The light from the fourth subpixel d in the first pixel group 110 passes through the No. 3 second modulation unit 443. The light from the first subpixel a in the second pixel group 120 passes through the No. 3 second modulation unit 443. The light from the fourth subpixel d in the second pixel group 120 passes through the No. 4 second modulation unit 444. The light from the first subpixel a in the third pixel group 130 passes through the No. 4 second modulation unit 444. The light from the fourth subpixel d in the fifth pixel group 140 passes through the No. 7 second modulation unit 447. The No. 3 second modulation unit 443, the No. 4 second modulation unit 444 and the No. 7 second modulation unit 447 all perform $\lambda/2$ phase modulation, by which the P-polarized light is modulated as S-polarized light, and the modulated light travels from the S polarizer to the convergent lenses. The above ten groups of light rays are converged to the twelfth view and the thirteenth view after passing through the convergent lenses to realize the 3D display.

The light from the first subpixel a in the first pixel group 110 can reach the No. 4 second modulation unit 444, the light from the fourth subpixel d in the third pixel group 130 can reach the No. 7 second modulation unit 447, the light from the first subpixel a in the fourth pixel group 140 can reach the No. 7 second modulation unit 447, the light from the first subpixel d in the fourth pixel group 140 can reach the No. 8 second modulation unit 448, and the light from the first subpixel a in the fifth pixel group 150 can reach the No. 8 second modulation unit 448. But, the No. 4 second modulation unit 444, the No. 7 second modulation unit 447, and the No. 8 second modulation unit 448 all perform $\lambda/2$ phase modulation, by which the S-polarized light emitted from the first liquid crystal phase modulator is modulated as P-polarized light, and the P-polarized light cannot travel to the convergent lenses through the S polarizer. This prevents the S-polarized light from entering into the eyes of the second viewer G2 at the first moment t1.

In addition, the light from the fourth subpixel d in the first pixel group 110 can reach the No. 5 second modulation unit 445. The light from the first subpixel a in the second pixel group 120 can reach the No. 5 second modulation unit 445. The light from the fourth subpixel d in the second pixel group 120 can reach the No. 6 second modulation unit 446. The light from the first subpixel a in the third pixel group 130 can reach the No. 6 second modulation unit 446. The light from the fourth subpixel d in the fifth pixel group 150 can reach the No. 9 second modulation unit 449. But, the No. 5 second modulation unit 445, the No. 6 second modulation unit 446, and the No. 9 two modulation units 448 all perform 0 phase modulation, which will not modulate the P-polarized light that is emitted from the first liquid crystal phase modulator, and the P-polarized light cannot travel to the convergent lenses through the S polarizer. This prevents the P-polarized light from entering into the eyes of the second viewer G2 at the first moment t1.

At the second moment t2, the first liquid crystal phase modulator modulates the light emitted from the first subpixels a and the fourth subpixels d in the first pixel group 110 to the fifth pixel group 150 (a total of ten subpixels) as: P-polarized light. S-polarized light, S-polarized light, S-polarized light, S-polarized light, P-polarized light, P-polarized light, P-polarized light, P-polarized light, and S-polarized light. The light travels to the second liquid crystal phase modulator through the transparent substrate.

The light from the first subpixel a in the first pixel group 110 passes through the No. 4 second modulation unit 444. The light from the fourth subpixel d in the third pixel group 130 passes through the No. 7 second modulation unit 447. The light from the first subpixel a in the fourth pixel group 140 passes through the No. 7 second modulation unit 447. The light from the fourth subpixel d in the fourth pixel group 140 passes through the No. 8 second modulation unit 448. The light from the first subpixel a in the fifth pixel group 150 passes through the No. 8 second modulation unit 448. The No. 4 second modulation unit 444, the No. 7 second modulation unit 447, and the No. 8 second modulation unit 448 all perform $\lambda/2$ phase modulation, by which the P-polarized light is modulated as S-polarized light, and the modulated light travels from the S polarizer to the convergent lenses. The light from the fourth subpixel d in the first pixel group 110 passes through the No. 5 second modulation unit 445. The light from the first subpixel a in the second pixel group 120 passes through the No. 5 second modulation unit 445. The light from the fourth subpixel d in the second pixel group 120 passes through the No. 6 second modulation unit 446. The light from the first subpixel a in the third pixel group 130 passes through the No. 6 second modulation unit 446. The light from the fourth subpixel a in the fifth pixel group 150 passes through the No. 9 second modulation unit 449. The No. 5 second modulation unit 445, the No. 6 second modulation unit 446 and the No. 9 second modulation unit 449 all perform 0 phase modulations, and the light travels out from the second liquid crystal phase modulator with the original S polarization state, and then goes from the S polarizer to the convergent lenses. The above-mentioned ten groups of light rays are converged to the fourth view and the fifth view after passing through the convergent lenses, so as to realize the 3D display.

The light from the first subpixel a in the first pixel group 110 can reach the No. 2 second modulation unit 442, the light from the fourth subpixel d in the third pixel group 130 can reach the No. 5 second modulation unit 445, the light from the first subpixel a in the fourth pixel group 140 can reach the No. 5 second modulation unit 445, the light from the fourth subpixel d in the fourth pixel group 140 can reach the No. 6 second modulation unit 446, and the light from the first subpixel a in the fifth pixel group 150 can reach the No. 6 second modulation unit 446. But, the No. 2 second modulation unit 442, the No. 5 second modulation unit 445, and the No. 6 second modulation unit 446 all perform 0 phase modulations, which will not modulate the P-polarized light that is emitted from the first liquid crystal phase modulator, and the P-polarized light cannot travel to the convergent lenses through the S polarizer. This prevents the P-polarized light from entering into the eyes of the first viewer G1 at the second moment t2.

The light from the fourth subpixel d in the first pixel group 110 can reach the No. 3 second modulation unit 443, the light from the first subpixel a in the second pixel group 120 can reach the No. 3 second modulation unit 443, the light from the fourth subpixel d in the second pixel group 120 can reach the No. 4 second modulation unit 444, the light from the first subpixel a in the third pixel group 130 can reach the No. 4 second modulation unit 444, and the light from the fourth subpixel d in the fifth pixel group 150 can reach the No. 7 second modulation unit 447. But, the No. 3 second modulation unit 443, the No. 4 second modulation unit 444 and the No. 7 second modulation unit 446 all perform $\lambda/2$ phase modulation, by which the S-polarized light emitted from the first liquid crystal phase modulator is modulated as P-polarized light, and the P-polarized light cannot travel through the S polarizer to the convergent lenses. This prevents the S-polarized light from entering into the eyes of the first viewer G1 at the second moment t2.

In this way, viewing of 3D display images by two viewers is realized, and the two viewers do not interfere with each other.

In other exemplary embodiments of the present disclosure, as shown in Table 15, the arrangement of the nine second modulation units may be: $\lambda/2$-$\lambda/2$-0-0-$\lambda/2$-$\lambda/2$-0-0-$\lambda/2$. In this case, as shown in Table 16, at the first moment t1, the first liquid crystal phase modulator modulates the light emitted from the first subpixels a and fourth subpixels d in the first pixel group 110 to the fifth pixel group 150 (a total of ten subpixels) as: P-polarized light, S-polarized light, S-polarized light, S-polarized light, S-polarized light, P-polarized light, P-polarized light, P-polarized light, P-polarized light, and S-polarized light. At the second moment t2, the first liquid crystal phase modulator modulates the light emitted from the first subpixels a and the fourth subpixels d in the first pixel group 110 to the fifth pixel group 150 as: S-polarized light, P-polarized light, P-polarized light, P-polarized light, P-polarized light, S-polarized light, S-polarized light, S-polarized light, S-polarized light, and P-polarized light. The display principle is the same as the above described embodiments, and thus details are not provided here.

TABLE 15

| numbers of second modulation units | 441 | 442 | 443 | 444 | 445 | 446 | 447 | 448 | 449 |
|---|---|---|---|---|---|---|---|---|---|
| polarization modulation states | $\lambda/2$ | $\lambda/2$ | 0 | 0 | $\lambda/2$ | $\lambda/2$ | 0 | 0 | $\lambda/2$ |

The above four implementations illustrate four situations when two viewers perform the 3D viewing at the same time, as well as the polarization modulation state arrangement of the first modulation unit and the polarization modulation state arrangement of the second modulation unit. The arrangement of the polarization modulation states of the first modulation unit and the arrangement of the polarization modulation states of the second modulation unit may have more forms, and the determination principle is the same as the that described above, and therefore, details are not repeated here.

The above embodiments are applicable to two viewers. It should be noted that the 3D display device can also be used for three or more viewers, and the spatial positions of the three viewers need to be determined at three moments within a set time period. The set time period is smaller than the refresh time of human vision. The polarization modulation member performs adjustments so that light only reaches one viewer at a moment, and there are many adjustment methods, which will not be described here.

The features, structures, or characteristics described above can be combined in one or more embodiments in any suitable manner. If possible, the features discussed in the embodiments are interchangeable. In the above descriptions, many specific details are provided to give a sufficient understanding of the embodiments of the present disclosure. However, those skilled in the art will realize that the technical solutions of the present disclosure can be practiced without one or more of the specific details, or other methods, components, materials, etc. can be used. In other cases, well-known structures, materials, or operations are not shown or described in detail to avoid obscuring aspects of the present disclosure.

In this specification, the terms "a", "an", "the", and "said" are used to indicate the presence of one or more elements/components, and so on; the terms "include" and "have" are open terms and means inclusive, and refers to that in addition to the listed elements/components and so on, there may be other elements/components and so on. The terms "first", "second", and so on are only used as marks, and should not be considered as constituting any limitations on the number of objects.

It should be understood that the present disclosure does not limit its application to the detailed structures and arrangements of the components proposed in the specification. The present disclosure can have other embodiments, and can be implemented and executed in various ways. The aforementioned modifications and changes fall within the scope of the present disclosure. It should be understood that the present invention disclosed and defined in this specification extends to all alternative combinations of two or more individual features mentioned or obvious in the text and/or

TABLE 16

| | subpixels | 110-a | 110-d | 120-a | 120-d | 130-a | 130-d | 140-a | 140-d | 140-a | 140-d |
|---|---|---|---|---|---|---|---|---|---|---|---|
| moment t1 | image slices | 13 | 12 | 13 | 12 | 13 | 12 | 13 | 12 | 13 | 12 |
| | polarization states | P | S | S | S | S | P | P | P | P | S |
| moment t2 | image slices | 5 | 4 | 5 | 4 | 5 | 4 | 5 | 4 | 5 | 4 |
| | polarization states | S | P | P | P | P | S | S | S | S | P |

What is claimed is:

1. A 3D display device, comprising:
a display panel;
a lens layer arranged on a light exit side of the display panel, and comprising a plurality of convergent lenses arranged in an array;
a human eye tracker provided on a side of the lens layer away from the display panel, wherein the human eye tracker is configured to determine spatial positions of one or more viewers' eyes relative to the display panel when facing the display panel; and
a controller electrically connected to the display panel and the human eye tracker, wherein the controller is configured to receive the spatial positions and control subpixels of the display panel corresponding to the spatial positions to display image slices corresponding to the spatial positions;
wherein the 3D display device further comprises:
a polarization modulation member arranged between the display panel and the lens layer, and electrically connected to the controller;
wherein the human eye tracker is configured to determine at least two spatial positions of at least two viewers' eyes relative to the display panel when facing the display panel, the at least two spatial positions corresponding to at least two moments within a preset time period one to one;
wherein the controller is configured to control subpixels corresponding to the at least two spatial positions to start to display image slices corresponding to the at least two spatial positions at corresponding moments;
wherein the polarization modulation member is configured to, according to the at least two spatial positions, adjust polarization modulation states of the polarization modulation member to make light from the subpixels corresponding to the at least two spatial positions pass through the polarization modulation member at a corresponding moment, so that the light is incident on a correspond one of the viewers;
wherein the polarization modulation member comprises:
a first polarization modulator arranged on the light exit side of the display panel, wherein the first polarization modulator comprises a plurality of first modulation units arranged in an array, and one subpixel of the display panel corresponds to one of the first modulation units of the first polarization modulator, and the first modulation units are configured to modulate polarization states of light emitted by corresponding subpixels; and
a second polarization modulator arranged on a side of the first polarization modulator away from the display panel, wherein the second polarization modulator comprises a plurality of second modulation units arranged in an array, one of the convergent lenses in the lens layer corresponds to one of the second modulation units of the second polarization modulator, and the second modulation units are configured to modulate polarization states of light passing through the first polarization modulator and make the light pass through or block the light;
wherein the 3D display device further comprises:
a light-transmitting substrate arranged between the first polarization modulator and the second polarization modulator;
wherein the display panel and the lens layer meets the following relational expressions:

$$\frac{L}{f} = \frac{w}{P_x}$$

$$\frac{L}{L+f} = \frac{D_1}{D_2}$$

$$D_2 = N * P_x$$

$$t = n * f$$

where L is a viewing distance from the viewers' eyes to the light-transmitting substrate; f is a focal length of each convergent lens in air; $D_1$ is a width of each convergent lens, $D_2$ is a width of a pixel island, and $D_1 \leq D_2$; N is a number of subpixels in a width direction of one pixel island, with a value of 4; Px is a width of a single subpixel; w is an interpupillary distance of a person, with a value of 65 mm; t is a thickness of the light-transmitting substrate; and n is a refractive index of the light-transmitting substrate.

2. The 3D display device according to claim 1, wherein the first polarization modulator comprises a first liquid crystal phase modulator.

3. The 3D display device according to claim 1, wherein the second polarization modulator comprises:
a second liquid crystal phase modulator configured to modulate the polarization states of the light passing through the first polarization modulator; and
a linear polarizer arranged on a side of the second liquid crystal phase modulator close to the lens layer, and configured to make the light modulated by the second liquid crystal phase modulator pass through or block the light modulated by the second liquid crystal phase modulator.

4. The 3D display device according to claim 3, wherein each of the convergent lenses is a liquid crystal convergent lens, which serves as the second liquid crystal phase modulator of the second polarization modulator, and the linear polarizer is arranged on a side of the lens layer away from the display panel.

5. The 3D display device according to claim 1, wherein the spatial positions are viewing zone order numbers and view numbers.

6. A display method for a 3D display device, wherein the 3D display device comprises:
a display panel;
a lens layer arranged on a light exit side of the display panel, and comprising a plurality of convergent lenses arranged in an array;
a human eye tracker provided on a side of the lens layer away from the display panel, wherein the human eye tracker is configured to determine spatial positions of one or more viewers' eyes relative to the display panel when facing the display panel; and
a controller electrically connected to the display panel and the human eye tracker, wherein the controller is configured to receive the spatial positions and control subpixels of the display panel corresponding to the spatial positions to display image slices corresponding to the spatial positions;

wherein the method comprises:

determining spatial positions of one or more viewers' eyes relative to a display panel when facing the display panel; and controlling subpixels of the display panel corresponding to the spatial positions to display image slices corresponding to the spatial positions;

wherein the determining spatial positions of one or more viewers' eyes relative to a display panel when facing the display panel, comprises:

determining at least two spatial positions of at least two viewers' eyes relative to the display panel when facing the display panel, the at least two spatial positions corresponding to at least two moments within a preset time period one to one;

wherein determining at least two spatial positions of at least two viewers' eyes relative to the display panel when facing the display panel, comprises:

determining, at a first moment, first spatial positions of eyes of a first viewer relative to the display panel when the eyes of the first viewer face the display panel; and determining, at a second moment, second spatial positions of eyes of a second viewer relative to the display panel when the eyes of the second viewer face the display panel;

wherein after the first spatial positions are determined, the display method further comprises:

controlling subpixels corresponding to the first spatial positions to start to display image slices corresponding to the first spatial positions at the first moment, and according to the first spatial positions, adjusting polarization modulation states of the polarization modulation member to make light from the subpixels corresponding to the first spatial positions pass through the polarization modulation member at the first moment, so that the light is incident only onto the first viewer;

wherein after the second spatial positions are determined, the display method further comprises:

controlling subpixels corresponding to the second spatial positions to start to display image slices corresponding to the second spatial positions at the second moment, and according to the second spatial positions, adjusting polarization modulation states of the polarization modulation member to make light from the subpixels corresponding to the second spatial positions pass through the polarization modulation member at the second moment, so that the light is incident only on the second viewer;

wherein a time interval between the first moment and the second moment is smaller than a refresh time of human vision.

7. The display method according to claim 6, further comprising:

controlling subpixels corresponding to the at least two spatial positions to start to display image slices corresponding to the at least two spatial positions at corresponding moments; and according to the at least two spatial positions, adjusting polarization modulation states of a polarization modulation member to make light from the subpixels corresponding to the at least two spatial positions pass through a polarization modulation member at a corresponding moment, so that the light is incident on a correspond one of the viewers.

8. The display method according to claim 6, wherein:

an arrangement of the polarization modulation states of second modulation units is based on an interval between a second modulation unit through which light from a subpixel is incident to the first viewer at the first moment and a second modulation unit through which light from the subpixel is incident to the second viewer at the second moment.

9. The display method according to claim 8, wherein:

if the first spatial positions and the second spatial positions are located in adjacent viewing zones, the polarization modulation states of second modulation units of a second polarization modulator are arranged alternately;

if the first spatial positions and the second spatial positions are located in viewing zones between which another viewing zone is provided, the polarization modulation states of the second modulation units of the second polarization modulator are arranged as: pairs of polarization modulation states are arranged alternately;

if the first spatial positions and the second spatial positions both span two viewing zones and the difference between the first spatial positions and the second spatial positions is one viewing zone, the polarization modulation states of the second modulation units of the second polarization modulator are arranged alternately; and if the first spatial positions and the second spatial positions both span two viewing zones if the first spatial positions and the second spatial positions both span two viewing zones and the difference between the first spatial positions and the second spatial positions is two viewing zones, the polarization modulation states of the second modulation units of the second polarization modulator are arranged as: pairs of the polarization modulation states are arranged alternately.

10. The display method o according to claim 9, wherein states of light emitted from a same subpixel after modulation by a first liquid crystal phase modulator in the 3D display device at the first moment and at the second moment are opposite.

* * * * *